United States Patent
Rahman et al.

(10) Patent No.: US 11,800,475 B2
(45) Date of Patent: Oct. 24, 2023

(54) ADAPTATION OF MAXIMUM OPERATIONAL TIMING DIFFERENCE FOR INTRA-BAND MULTICARRIER OPERATION BASED ON NUMBER OF INDEPENDENT TIMING MANAGEMENT GROUPS

(71) Applicant: Telefonaktiebolaget LM Ericsson (publ), Stockholm (SE)

(72) Inventors: Imadur Rahman, Sollentuna (SE); Magnus Sandgren, Staffanstorp (SE); Muhammad Kazmi, Sundbyberg (SE); Christian Bergljung, Lund (SE); Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 199 days.

(21) Appl. No.: 17/268,976

(22) PCT Filed: Oct. 24, 2019

(86) PCT No.: PCT/SE2019/051048
§ 371 (c)(1),
(2) Date: Feb. 17, 2021

(87) PCT Pub. No.: WO2020/096505
PCT Pub. Date: May 14, 2020

(65) Prior Publication Data
US 2021/0314888 A1    Oct. 7, 2021

Related U.S. Application Data

(60) Provisional application No. 62/757,548, filed on Nov. 8, 2018.

(51) Int. Cl.
*H04W 56/00* (2009.01)

(52) U.S. Cl.
CPC .................. *H04W 56/004* (2013.01)

(58) Field of Classification Search
CPC ......... H04W 72/0446; H04W 56/0045; H04W 74/0833; H04W 72/0413; H04W 56/004; H04W 72/1278; H04L 5/0053
See application file for complete search history.

(56) References Cited

U.S. PATENT DOCUMENTS

2016/0345316 A1* 11/2016 Kazmi .............. H04W 72/0446

OTHER PUBLICATIONS

PCT International Search Report and Written Opinion dated Jan. 24, 2020 for International Application No. PCT/SE2019/051048, 8 pages.

(Continued)

*Primary Examiner* — Anez C Ebrahim
(74) *Attorney, Agent, or Firm* — SAGE PATENT GROUP

(57) ABSTRACT

A method, network node and wireless device (WD) for adaptation of maximum operational timing difference (MOTD) for intra-band multicarrier operation based on number of independent timing management groups are disclosed. According to one aspect, a process in a network node includes determining a 5 maximum operational time difference parameter based on a number (N) of transmit timing management groups (TMG) configured at a WD. The process also includes operating to receive or transmit at least one of a: signal S1 between the WD and a first cell and signal S2 between the WD and a second cell based on the determined MOTD parameter. The process also includes using the determined MOTD parameter for one 10 or more operational tasks.

18 Claims, 11 Drawing Sheets

(56) References Cited

OTHER PUBLICATIONS

3GPP, 3GPP TSG-RAN WG4 Meeting #78bis, R4-162477, Nokia, "Discussion on the Maximum UL Transmission Timing Difference for DC", San Jose del Cabo, Mexico, Apr. 11-15, 2016, XP051084339, 3 pages.

* cited by examiner

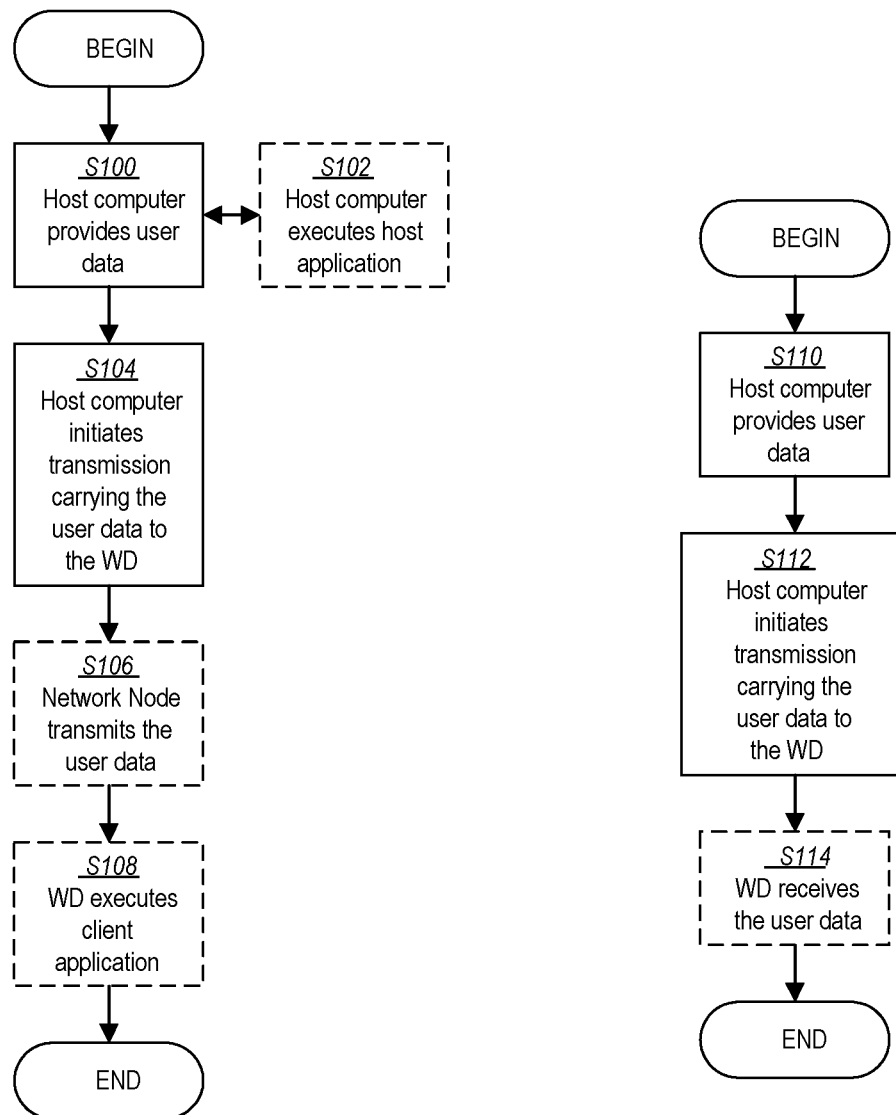

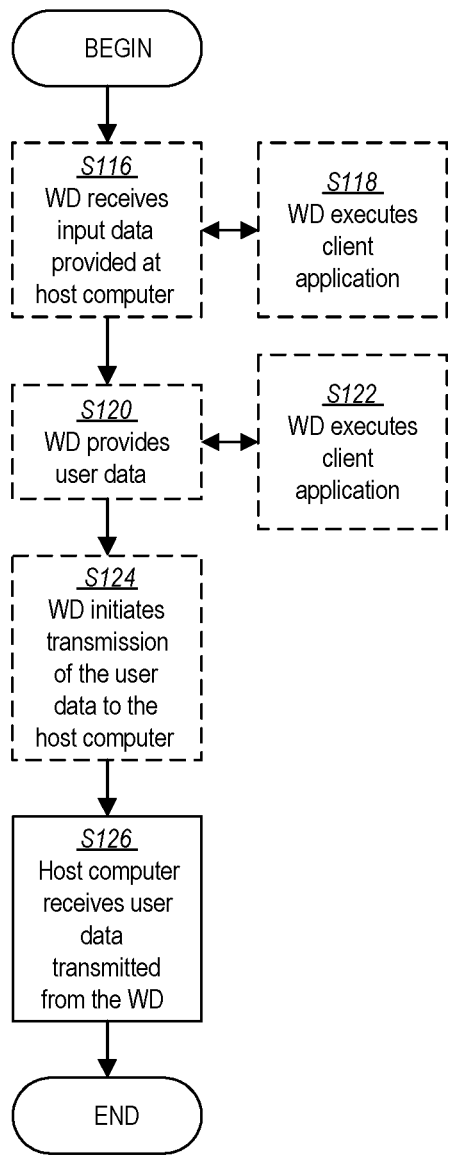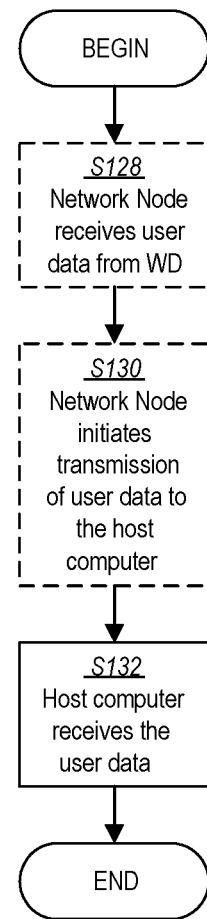
FIG. 9
FIG. 10

ADAPTATION OF MAXIMUM OPERATIONAL TIMING DIFFERENCE FOR INTRA-BAND MULTICARRIER OPERATION BASED ON NUMBER OF INDEPENDENT TIMING MANAGEMENT GROUPS

CROSS-REFERENCE TO RELATED APPLICATIONS

This application is a 35 U.S.C. § 371 national stage application for International Application No. PCT/SE2019/051048, entitled "ADAPTATION OF MAXIMUM OPERATIONAL TIMING DIFFERENCE FOR INTRA-BAND MULTICARRIER OPERATION BASED ON A NUMBER OF INDEPENDENT TIMING MANAGEMENT GROUPS", filed on Oct. 24, 2019, which claims the benefit of and priority to U.S. Provisional Patent Application No. 62/757,548, filed Nov. 8, 2018, the disclosures and contents of which are hereby incorporated by reference in their entireties.

TECHNICAL FIELD

The present disclosure relates to wireless communications, and in particular, to adaptation of maximum operational timing difference (MOTD) for intra-band multicarrier operation based on number/quantity of independent timing management groups.

BACKGROUND

New Radio (NR) (also known as "5G" or Next Generation) architecture is being discussed and developed in the Third Generation Partnership Project (3GPP). The current concept is illustrated in FIG. 1, where eNB denotes a Long Term Evolution (LTE) eNodeB, gNB denotes a NR base station (BS) (one NR BS may correspond to one or more transmission/reception points), and the lines between the nodes illustrate the corresponding interfaces which are under consideration by the 3GPP. Further, FIG. 2 illustrates example deployment scenarios with a NR BS.

NR Numerology

In NR, which is based on orthogonal frequency division multiplexing (OFDM), multiple numerologies are supported for operation, e.g., transmission and/or reception of signals. In a non-limiting sense, the term "numerology" may characterize any one or more of: frame duration, subframe or transmission time interval (TTI) duration, slot duration, mini-slot duration, symbol durations subcarrier spacing, number of subcarriers per physical channel (e.g. resource block (RB)), cyclic prefix (CP) length, number of RBs within the bandwidth.

A scaling approach (based on a scaling factor 2N, N=1, 2, . . . ) may be considered for deriving subcarrier spacings for NR: 15 kHz, 30 kHz, 60 kHz, 120 KHz, etc. The numerology-specific time resource durations (e.g. slot, subframe, etc.) can then be determined in ms based on the subcarrier spacing: subcarrier spacing of (2N*15) kHz gives exactly ½N ms.

Table 1 illustrates examples of numerology for NR in terms of carrier spacings, slot duration, symbol duration, CP length, etc.

TABLE 1

| Subcarrier spacing | 15 kHz | 30 kHz (2 × 15 kHz) | 60 kHz (4 × 15 kHz) | 120 kHz (8 × 15 kHz) | 240 kHz (16 × 15 kHz) |
|---|---|---|---|---|---|
| Example slot duration | 500 μs | 250 μs | 125 μs | 77.5 μs | 38.75 μs |
| OFDM symbol, duration | 66.67 μs | 33.33 μs | 16.67 μs | 8.335 μs | 4.1675 μs |
| Cyclic prefix, duration | 4.76 μs | 2.38 μs | 1.19 μs | 0.595 μs | 0.2975 μs |
| OFDM symbol including cyclic prefix | 71.43 μs | 35.71 μs | 17.86 μs | 8.93 μs | 4.465 μs |

Multicarrier Operation

The term multicarrier refers to carrier aggregation or multi-connectivity or combination thereof. Multi-connectivity operation comprises two or more cell groups. In carrier aggregation (CA) the terminal is configured with a primary component carrier (CC) (or cell or Serving cell) which is referred to as the Primary Cell or PCell. The PCell is particularly important, e.g., due to the fact that control signaling is signaled on this cell, etc., also the wireless device (WD) performs monitoring of the radio quality on the PCell. A CA capable terminal can, as explained above, also be configured with additional carriers (or cells or serving cells) which are referred to as Secondary Cells (SCells).

In dual connectivity (DC), which is a special case of multi-connectivity, a WD in RRC_CONNECTED state is configured with a Master Cell Group (MCG) and a Secondary Cell Group (SCG). A Cell Group (CG) is a group of serving cells associated with either the master network node (MN) or the secondary network node (SN) respectively. Examples of MN and SN are: MeNB and SeNB, respectively in LTE-LTE dual connectivity (DC), MgNB and SgNB respectively in NR-NR DC, MeNB and SgNB respectively in Evolved universal terrestrial access network dual connectivity (EN-DC), MgNB and SeNB respectively in NE-DC etc. The MCG and SCG are defined as follows: Master Cell Group (MCG) is a group of serving cells associated with the MN, comprising of the PCell and optionally one or more SCells; Secondary Cell Group (SCG) is a group of serving cells associated with the SN comprising of pSCell (Primary SCell) and optionally one or more SCells.

Multiple TAGs

A WD configured with CA, is configured with at least one Timing Advance Group (TAG) which is pTAG containing PCell. The pTAG may also contain one or more SCells.

The WD capable of supporting multiple timing advances may also be configured with one or more serving cells with uplink in one or more sTAGs, in addition to pTAG.

The WD capable of supporting dual connectivity should be configured with one pTAG and may also be configured with one psTAG. The pTAG shall contain the PCell and may also contain one SCell, if configured. The psTAG shall contain the PSCell and may also contain one SCell, if configured. In pTAG, the WD should use the PCell as the reference cell for deriving the WD transmit timing for pTAG, and in psTAG, and the WD should use the PSCell as the reference cell for deriving the WD transmit timing for psTAG.

Maximum Operational Timing Difference (MOTD)

Maximum operational timing difference (MOTD) is defined as the timing difference experienced or which can be handled by the WD at the WD transmitter or WD receiver. MOTD is a generic term. Specific examples of MOTD include but are not limited to Maximum Receive Timing Difference (MRTD), Maximum Transmission Timing Difference (MTTD) etc. MRTD is the received time difference of signals received at the WD from two different serving cells. MTTD is the transmission time difference between signals transmitted by the WD from serving cells belonging to two different transmit timing management groups (TMG). Examples of TMG are pTAG, sTAG, psTAG, etc. In each TMG the WD maintains one common transmission timing for transmitting uplink signals from all serving cells belonging to that (the same) TMG.

Maximum Receive Timing Difference

In CA there is limit on the maximum receive timing difference (MRTD) of the signals from PCell and Scell(s) received at the WD receiver. The maximum receive timing difference (MRTD) depends on one or more of: numerologies (e.g., sub-carrier spacing (SCS)) of signals from the PCell and the SCell, the WD architecture, etc. For example, the WD can perform CA operation provided that the received time difference ($\Delta R$) between the signals received at the WD from the CCs belonging to the PCell and SCell(s) are within a certain threshold called herein as MRTD e.g., ±30.26 µs.

In dual connectivity (DC), the handling of the maximum received timing difference (MRTD) of the signals from MN and SN received at the WD depends on one or more of: the WD architecture, numerologies (e.g., sub-carrier spacing (SCS)) of signals from the MN (e.g. PCell) and the SN (e.g. PSCell), etc. This gives rise to two cases of dual connectivity (DC) operation with respect to the WD synchronization status or level namely: synchronized DC operation and unsynchronized DC operation. The synchronized DC operation and unsynchronized DC operation are also interchangeably called asynchronous and asynchronous DC.

The synchronized operation herein means that the WD can perform DC operation provided the received time difference (MRTD) between the signals received at the WD from the CCs belonging to the MCG and SCG are within a certain threshold, e.g. ±33 µs. As a particular example, the synchronized operation herein means that the received time difference (MRTD) between the signals received at the WD from the subframe boundaries of the CCs belonging to the MCG and SCG are within a certain threshold (e.g. MRTD) e.g., ±33

The unsynchronized operation herein means that the WD can perform DC operation regardless of the received time difference ($\Delta R$) between the signals received at the WD from the CCs belonging to the MCG and SCG, i.e., for any value of $\Delta R$. As a particular example, the unsynchronized operation herein means that the received time difference ($\Delta R$) between the signals received at the WD from the subframe boundaries of the CCs belonging to the MCG and SCG can be any value e.g. more than ±33 µs, any value up to ±0.5 ms, etc.

The maximum receive timing difference (MRTD) at the WD is impacted by at least three components, for example:

Relative propagation delay difference between signals from the serving cells experienced at the WD ($\Delta RF$ prop) e.g. between MN and SN in DC or between PCell and SCell in CA, Transmission timing difference ($\Delta T$) between signals transmitted by the serving cells e.g. due to time synchronization levels between antenna connectors of the serving cells e.g. between MN and SN in DC or between PCell and SCell in CA, and Delay due to multipath propagation of radio signals e.g. multipath depends on the radio propagation channel delay spread.

Relative Propagation Delay Difference

As an example, the maximum MRTD of 30.26 µs is designed for worst case non-co-located CA coverage case. This is shown in FIG. 3. The MRTD of 30.26 µs corresponds to signal propagation distance of just over 9 km. In dense urban scenarios, maximum receive timing misalignment due to propagation delay that can be seen is around 10 µs. This is linearly related to relative physical distance between the nodes.

Transmit Timing Difference Between Serving Cells

In multicarrier operation, the transmit timing between serving cells (e.g. between PCell and SCell transmit timing or between PCell and PSCell, etc.) needs to be synchronized up to certain level of time accuracy. In DC the serving cells belong to different cell groups e.g. to MN and SN. It is worth noting here that, the MRTD is the received timing misalignment between two received signals at the WD. In other words, the MTRD is not the transmit timing mismatch level between the serving cells. As an example, the transmit timing synchronization between the serving cells can be 3 µs.

Delay Due to Multipath Radio Environment

The received time difference of radio signals from the serving cells may also incorporate additional delay introduced by the multipaths due to the characteristics of the radio environment. For example, in typical urban environment the delay spread of multiple paths received at the WD may typically be in the order of 1 to 3 µs. However, in wide areas such as suburban or rural deployment scenarios, the channel delay spread due to multipath effect of signals observed at the WD is relatively smaller, e.g., less than 1 µs.

Maximum Transmission Timing Difference

MTTD is directly related to MRTD. MTTD is function of MRTD. For example, MTTD may be defined as: MRTD plus the uplink (UL) transmission (from WD to network node) accuracy of signals transmitted by the WD. The UL transmission accuracy is already defined in the 3GPP specifications for LTE and NR by covering various components in an uplink timing error budget.

Furthermore, the WD is also capable of handling a maximum uplink transmission timing difference (MTTD) between TAGs in multicarrier operation e.g. between PCell and PSCell belonging to pTAG in MN and psTAG in SN respectively in DC or between PCell and SCell belonging to pTAG and sTAG respectively in DC. As an example, MTTD can be:

35.21 µs if the WD is capable of synchronous inter-band dual connectivity assuming 15 KHz SCS in both serving cells involved in MTTD and Up to 500 µs if the WD is capable of asynchronous inter-band dual connectivity assuming 15 KHz SCS in both serving cells involved in MTTD.

According to certain standards organizations such as the 3GPP, UL timing follows the downlink (DL) timing for each of the RATs with additional specified allowed WD uplink errors. Thus, UL timing may follow the DL timing.

As shown in the FIG. 4, the MRTD and corresponding MTTD may need to be defined even when only collocated deployment (i.e. (ΔRF prop)=0) is allowed. Such may be the case, for example, in Rel-15 of the 3GPP.

As an example, intra band ENDC is restricted to co-located deployments (A RF prop=0) for 3GPP Rel-15. The reason for MRTD≠0 in ENDC is due to the fact that, LTE and NR have different internal timings (i.e. also TAE≠0). If NR DL reception at the WD is late (MRTD≠0) it means that the NR system timing is delayed compared to LTE. This also means that the corresponding WD NR uplink transmission must have a delay offset compared to LTE to correctly match the NR timing. This is handled by having two independent timing advance (TA) loops or more generally timing management group (TAMG) for the uplinks that makes sure the uplink is received correctly for both LTE and NR independently.

Note that the uplink reception at the base station for both NR and LTE should be aligned towards other WD uplink transmissions in the cell not only for a specific WD with EN-DC connection, i.e., multiple relations exist in the uplink.

In the current NR specifications, a fixed MRTD or MTTD is defined for multicarrier operation, without considering any WD transmit timing management capabilities. Thus, the current requirement framework provides a single MRTD requirement which does not consider the WD capability related to UL timing management. As a result, WDs that cannot support multiple UL timing management will not be able to perform certain types of multi-carrier operations or associated features, such as intra-band EN-DC, intra-band NE-DC, etc. This will result in the WD not being able to be operated in multicarrier mode and therefore the WD performance and also the system performance will be degraded. For example, maximum supported user throughput will decrease and cell throughput will decrease.

SUMMARY

Some embodiments advantageously provide methods, network nodes and wireless devices for adaptation of maximum operational timing difference (MOTD) for intra-band multicarrier operation based on number/quantity of independent timing management groups.

Some embodiments include several methods in the WD and the network node. A main idea is that, a maximum operational time difference (MOTD) between a first signal (S1) and a second signal (S2) at the WD depends on the WD transmit timing management group (TMG) capability.

An example of TMG is a timing advance group (TAG), e.g., pTAG, psTAG, sTAG, etc.

For example, if the WD is configured with a single TAG then the WD can operate with the common TA for all carriers in the multicarrier operation, e.g., in CA. In this case the WD may support MRTD of up to 260 ns. In another example if the WD is configured with dual TAG then the WD can operate with two different TAs for carriers belonging to their respective TAGs in the multicarrier operation e.g. in DC, CA. In this case the WD may support MRTD and MTTD of up to 3 μs and 5.21 μs respectively. The WD may be configured with a certain number of TMGs based on the WD's supported capability, i.e., the configured number of TMGs is less than or equal to the maximum number of TMGs supported by the WD.

According to one aspect of the disclosure, a wireless device configured to communicate with a network node is provided. The wireless device includes processing circuitry configured to: determine a quantity of timing management groups, TMGs, associated with a first signal in a first cell and a second signal in a second cell, determine at least one maximum operational timing difference, MOTD, parameter based at least in part on the quantity of TMGs where the at least one MOTD parameter corresponds to a maximum time difference in communication between the first signal and the second signal, and communicate with the first cell using the first signal and the second cell using the second signal based at least in part on the at least one MOTD parameter.

According to one or more embodiments of this aspect, the quantity of TMGs is determined to be one TMG, the first cell and second cell being part of the one TMG. According to one or more embodiments of this aspect, the quantity of TMGs is determined to be greater than two TMGs where the at least one MOTD parameter corresponds to a plurality of MOTD parameters and each TMG operates according to a respective one of the plurality of MOTD parameters. According to one or more embodiments of this aspect, the processing circuitry is further configured to: determine whether an estimate of a communication of the first signal and second signal exceeds the at least one MOTD parameter, and perform.

According to one or more embodiments of this aspect, if the estimate of the communication of the first signal and second signal exceeds the at least one MOTD parameter, the at least one operational task includes at least one of: stopping multicarrier operation, releasing one of the first cell and second cell, discarding at least communication of at least one of the first signal and second signal and discarding at least one data block. According to one or more embodiments of this aspect, if the estimate of the communication of the first signal and second signal does not exceed the at least one MOTD parameter, the at least one operational task includes at least one of: using a third cell for communication in addition to the first cell and second cell and resuming multicarrier operation. According to one or more embodiments of this aspect, the estimate of the communication of the first signal and second signal is an estimate of a magnitude of the time difference between the first signal and second signal. According to one or more embodiments of this aspect, the estimate of the magnitude of the time difference between the first signal and the second signal corresponds to an estimate of one of a magnitude of a receive time difference between the first signal and the second signal and a magnitude of a transmit time difference between the first signal and the second signal According to one or more embodiments of this aspect, the at least one MOTD parameter is one of a maximum receive time difference and maximum transmit time difference.

According to one or more embodiments of this aspect, the communicating with the first cell using the first signal and the second cell using the second signal is part of one of carrier aggregation and dual connectivity. According to one or more embodiments of this aspect, each TMG of the quantity of TMGs is a timing advance group that is associated with a set of timing parameters different from the at least one MOTD parameter for performing the communication with the first cell using the first signal and the second cell using the second signal. According to one or more embodiments of this aspect, the determination of the at least one MOTD parameter is further based at least in part on numerology associated with at least one carrier of at least one serving cell, at least one frequency range of at least one carrier of the at least one serving cell and a predefined relation between a plurality of carriers of a plurality of serving cells. According to one or more embodiments of this aspect, the quantity of TMGs associated with the first signal in the first cell and the second signal in the second cell corresponds to one of a quantity of TMGs the wireless device is configured to support and a quantity of TMGs the wireless device is able to support based on wireless device capability.

According to another aspect of the disclosure, a method for a wireless device configured to communicate with a network node is provided. A quantity of timing management groups, TMGs, associated with a first signal in a first cell and a second signal in a second cell is determined. At least one maximum operational timing difference, MOTD, parameter is determined based at least in part on the quantity of TMGs where the MOTD parameter corresponds to a maximum time difference in communication between the first signal and the second signal. communication with the first cell using the first signal and the second cell using the second signal is performed based at least in part on the at least one MOTD parameter.

According to one or more embodiments of this aspect, the quantity of TMGs is determined to be one TMG where the first cell and second cell are part of the one TMG. According to one or more embodiments of this aspect, the quantity of TMGs is determined to be greater than two TMGs where the at least one MOTD parameter corresponds to a plurality of MOTD parameters and each TMG operates according to a respective one of the plurality of MOTD parameters.

According to one or more embodiments of this aspect, a determination is performed whether an estimate of a communication of the first signal and the second signal exceeds the at least one MOTD parameter. At least one operational task is performed based at least in part on whether the estimate of the communication of the first signal and second signal exceeds the at least one MOTD parameter. According to one or more embodiments of this aspect, if the estimate of the communication of the first signal and second signal exceeds the at least one MOTD parameter, the at least one operational task includes at least one of: stopping multicarrier operation, releasing one of the first cell and second cell, discarding at least communication of at least one of the first signal and second signal and discarding at least one data block.

According to one or more embodiments of this aspect, if the estimate of the communication of the first signal and second signal does not exceed the at least one MOTD parameter, the at least one operational task includes at least one of: using a third cell for communication in addition to the first cell and second cell, and resuming multicarrier operation. According to one or more embodiments of the disclosure, the estimate of the communication of the first signal and second signal is an estimate of a magnitude of the time difference between the first signal and second signal. According to one or more embodiments, the estimate of the magnitude of the time difference between the first signal and second signal corresponds to an estimate of one of a magnitude of a receive time different between the first signal and the second signal and a magnitude of a transmit time difference between the first signal and second signal.

According to one or more embodiments of this aspect, the at least one MOTD parameter is one of a maximum receive time difference and maximum transmit time difference. According to one or more embodiments of this aspect, the communicating with the first cell using the first signal and the second cell using the second signal is part of one of carrier aggregation and dual connectivity. According to one or more embodiments of this aspect, each TMG of the quantity of TMGs is a timing advance group that is associated with a set of timing parameters different from the at least one MOTD parameter for performing the communication with the first cell using the first signal and the second cell using the second signal.

According to one or more embodiments of this aspect, the determination of the at least one MOTD parameter is further based at least in part on numerology associated with at least one carrier of at least one serving cell, at least one frequency range of at least one carrier of the at least one serving cell and a predefined relation between a plurality of carriers of a plurality of serving cells. According to one or more embodiments of this aspect, the quantity of TMGs associated with the first signal in the first cell and the second signal in the second cell corresponds to one of a quantity of TMGs the wireless device is configured to support and a quantity of TMGs the wireless device is able to support based on wireless device capability.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 7 is a flowchart illustrating exemplary methods implemented in a communication system including a host computer, a network node and a wireless device for executing a client application at a wireless device according to some embodiments of the present disclosure;
FIG. 8 is a flowchart illustrating exemplary methods implemented in a communication system including a host computer, a network node and a wireless device for receiving user data at a wireless device according to some embodiments of the present disclosure;
FIG. 9 is a flowchart illustrating exemplary methods implemented in a communication system including a host computer, a network node and a wireless device for receiving user data from the wireless device at a host computer according to some embodiments of the present disclosure;
FIG. 10 is a flowchart illustrating exemplary methods implemented in a communication system including a host computer, a network node and a wireless device for receiving user data at a host computer according to some embodiments of the present disclosure.

DETAILED DESCRIPTION

Figure 1:
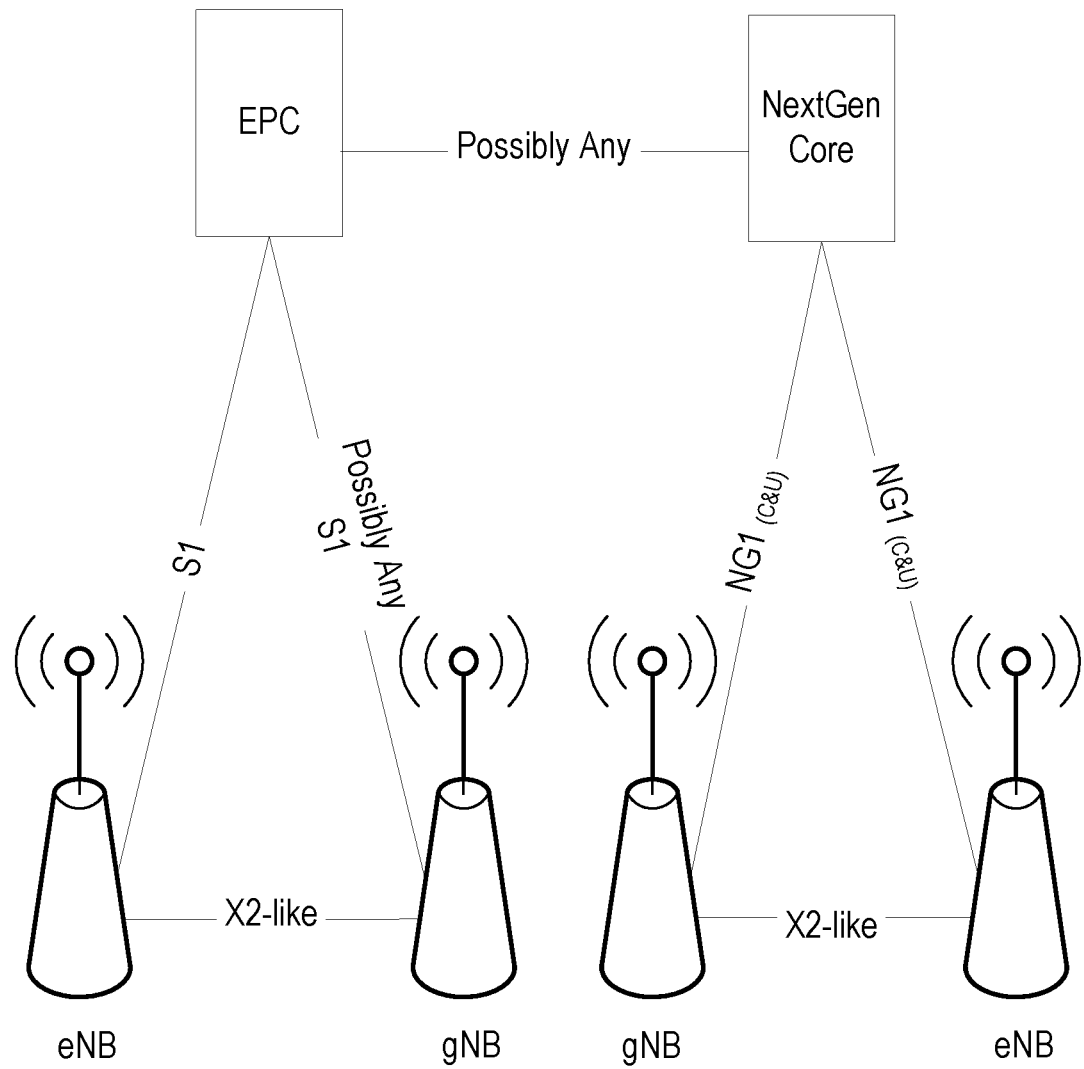
FIG. 1 illustrate an example NR architecture.
Figure 2:
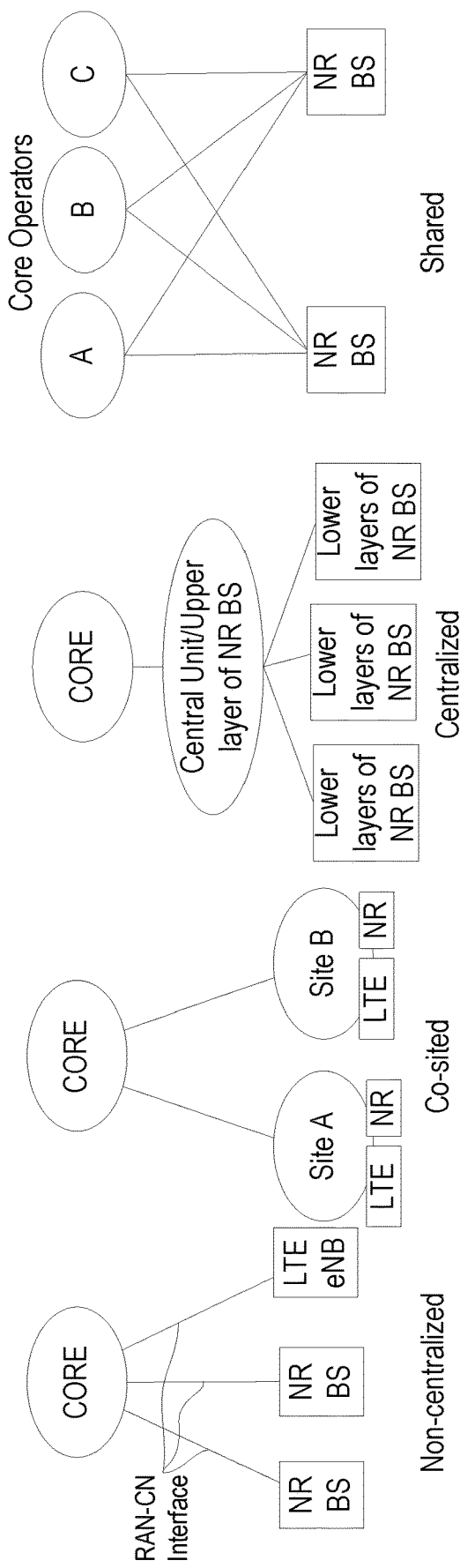
FIG. 2 illustrates example NR deployment scenarios.
Figure 3:
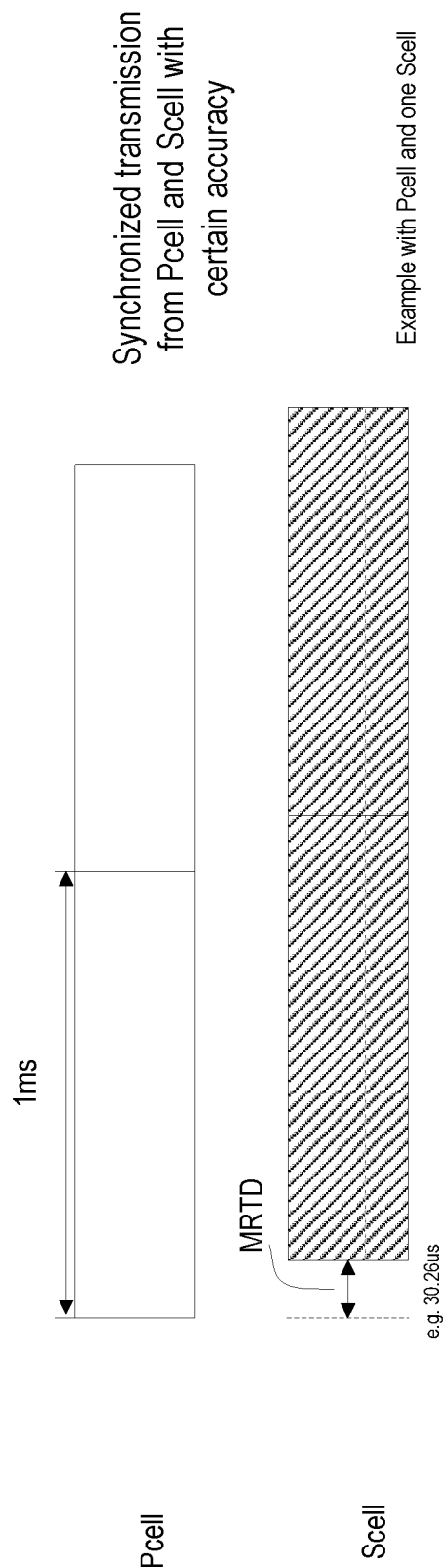
FIG. 3 illustrates MRTD timing.
Figure 4:
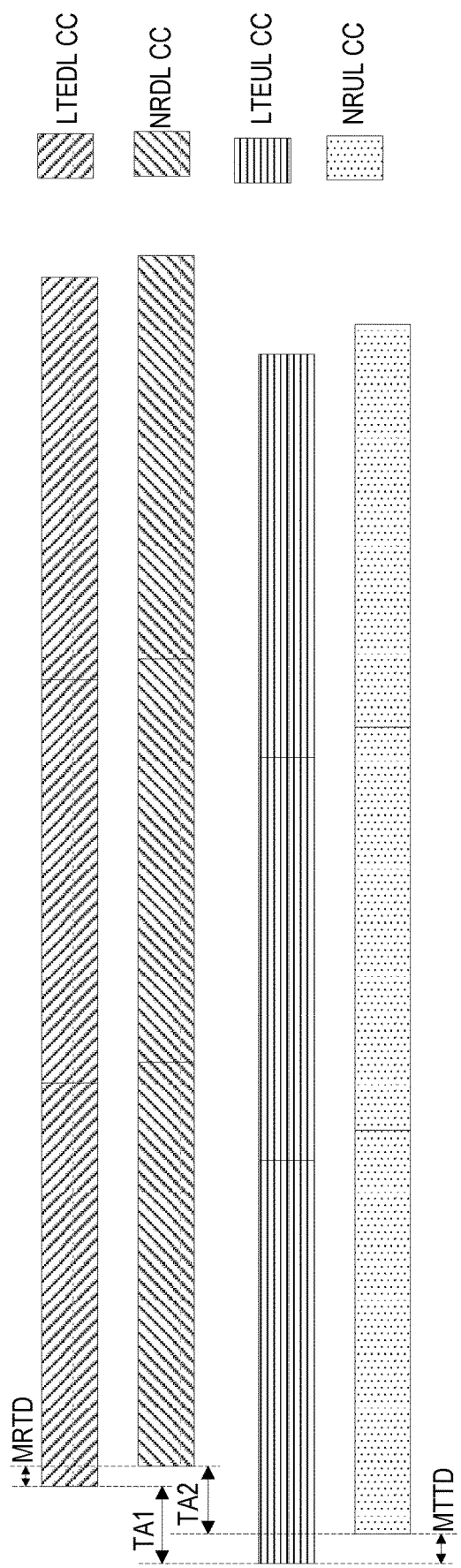
FIG. 4 illustrates MRTD and corresponding MTTD.

Before describing in detail exemplary embodiments, it is noted that the embodiments reside primarily in combinations of apparatus components and processing steps related to supporting multicarrier operation in a wireless communication environment, and specifically adaptation of maximum operational timing difference (MOTD) for intra-band multicarrier operation based on number of independent timing management groups. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In some embodiments, a first node and a second node are two nodes which are either transmitting or receiving signals. An example of a first node could be a network node, which could be a more general term and can correspond to any type of radio network node or any network node, which communicates with a WD and/or with another network node. Examples of network nodes are NodeB, base station (BS), multi-standard radio (MSR) radio node such as MSR BS, eNodeB, gNodeB. MeNB, SeNB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT etc.

Another example of a node could be user equipment (UE) or WD, The non-limiting term refers to any type of wireless device communicating with a network node and/or with another WD in a cellular or mobile communication system. Examples of WD are target device, device to device (D2D)

WD, machine type WD or WD capable of machine to machine (M2M) communication, PDA, iPAD, Tablet, mobile terminals, smart phone, laptop embedded equipped (LEE), laptop mounted equipment (LME), USB dongles etc.

In some embodiments generic terminology, "radio network node" or simply "network node (NW node)", is used. It can be any kind of network node which may comprise of base station, radio base station, base transceiver station, base station controller, network controller, evolved Node B (eNB), Node B, relay node, access point, radio access point, Remote Radio Unit (RRU) Remote Radio Head (RRH) etc.

Any of the above mentioned nodes could become "the first node" and/or "the second node".

The term radio access technology, or RAT, may refer to any RAT, e.g., UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term multi-carrier operation can be either a carrier aggregation (CA) or dual-connectivity (DC) or a multi-connectivity operation. The aggregated carriers can be from same RAT or from different RATs.

In carrier aggregation (CA), the WD is configured with two or more carriers and the WD can have multiple serving cells. The term 'serving cell' herein means that the WD is configured with the corresponding serving cell and may receive from and/or transmit data to the network node on the serving cell e.g. on PCell or any of the SCells. The data is transmitted or received via physical channels e.g. PDSCH in DL, PUSCH in UL, etc. A component carrier (CC) also interchangeably called as carrier or aggregated carrier, PCC or SCC is configured at the WD by the network node using higher layer signaling e.g. by sending RRC configuration message to the WD. The configured CC is used by the network node for serving the WD on the serving cell (e.g. on PCell, PSCell, SCell etc.) of the configured CC. The configured CC is also used by the WD for performing one or more radio measurements (e.g. RSRP, RSRQ etc.) on the cells operating on the CC e.g. PCell, SCell or PSCell and neighboring cells.

The term dual connectivity used herein may refer to the operation mode wherein the WD can be served by at least two nodes called master node (MN) (e.g. master eNB (MeNB), master gNB (MgNB) etc.) and secondary node (SN) (e.g. secondary eNB (SeNB), secondary gNB (SgNB) etc.). More generally in multiple connectivity (or multi-connectivity) operation the WD can be served by two or more nodes e.g. MeNB, SeNB1, SeNB2 and so on. The WD is configured with PCC from both MN and SN. As an example, the main serving cells from MN and SN are called as PCell and PSCell respectively. The PCell and PSCell operate the WD typically independently. The WD is also configured with one or more SCCs from each node involved in multi-connectively e.g. one or more SCells from MN and SN. The corresponding secondary serving cells served by MN and SN are called SCell. The WD in DC typically has separate TX/RX for each of the connections with MN and SN. This allows the MN and SN to independently configure the WD with one or more procedures e.g. radio link monitoring (RLM), DRX cycle, etc., on their respective PCell and PSCell. The above definitions also include dual connectivity (DC) operation, which is performed based on corresponding CA configurations. In NR, there are different variants of multi-connectively e.g. EN-DC, NE-DC, NR-NR SC etc. In EN-DC, the MN contains LTE serving cells with at least LTE PCell and the SN contains NR serving cells with at least NR PSCell. In NE-DC, the MN contains NR serving cells with at least NR PCell and the SN contains LTE serving cells with at least LTE PSCell. In NR-NR DC (NN-DC), the MN contains NR serving cells with at least NR PCell and the SN also contains NR serving cells with at least NR PSCell. The embodiments are applicable for any type or variant of multi-connectivity operation in NR, LTE or any other RAT or combination of different RATs. In this invention disclosure, all methods that are described for CA operation are equally applicable to DC operation, unless stated otherwise.

The term signal used herein can be any physical signal or physical channel. Examples of physical signals are reference signal such as PSS, SSS, CSI-RS, DMRS, signals in SSB, CRS, PRS, etc. The term physical channel (e.g., in the context of channel reception) used herein is also called as 'channel. Examples of physical channels are MIB, PBCH, NPBCH, PDCCH, PDSCH, sPUCCH, sPDSCH, sPUCCH, sPUSCH, MPDCCH, NPDCCH, NPDSCH, E-PDCCH, PUSCH, PUCCH, NPUSCH etc.

The term time resource used herein may correspond to any type of physical resource or radio resource expressed in terms of length of time. Examples of time resources are: symbol, time slot, subframe, radio frame, transmission time interval (TTI), interleaving time, etc.

The term TTI used herein may correspond to any time period (T0) over which a physical channel can be encoded and optionally interleaved for transmission. The physical channel is decoded by the receiver over the same time period (T0) over which it was encoded. The TTI may also interchangeably called as short TTI (sTTI), transmission time, slot, sub-slot, mini-slot, mini-subframe, etc.

Embodiments provide adaptation of maximum operational timing difference (MOTD) for intra-band multicarrier operation based on number of independent timing management groups. In a first embodiment, a WD may be configured with a certain number (N) of TMGs and based on the configured value of N, the WD may determine at least one MOTD parameter (e.g., MRTD, MTTD, etc.) used by the WD for receiving and/or transmitting signals with respect to two or more serving cells. The WD further may use the determined MOTD parameter(s) for performing one or more operational tasks (e.g., reception of signals from two or more serving cells, transmission of signals to two or more serving cells, etc.).

In a second embodiment, a network node may configure a WD with a certain number (N) of TMGs and, based on the configured value of N, may determine at least one MOTD parameter (e.g. MRTD, MTTD, etc.) used by the network node for receiving and/or transmitting signals with respect to two or more cells serving the cell.

The network node may further use the determined MOTD parameter(s) for performing one or more operational tasks (e.g., reception of signals, transmission of signals, etc.).

Figure 5:
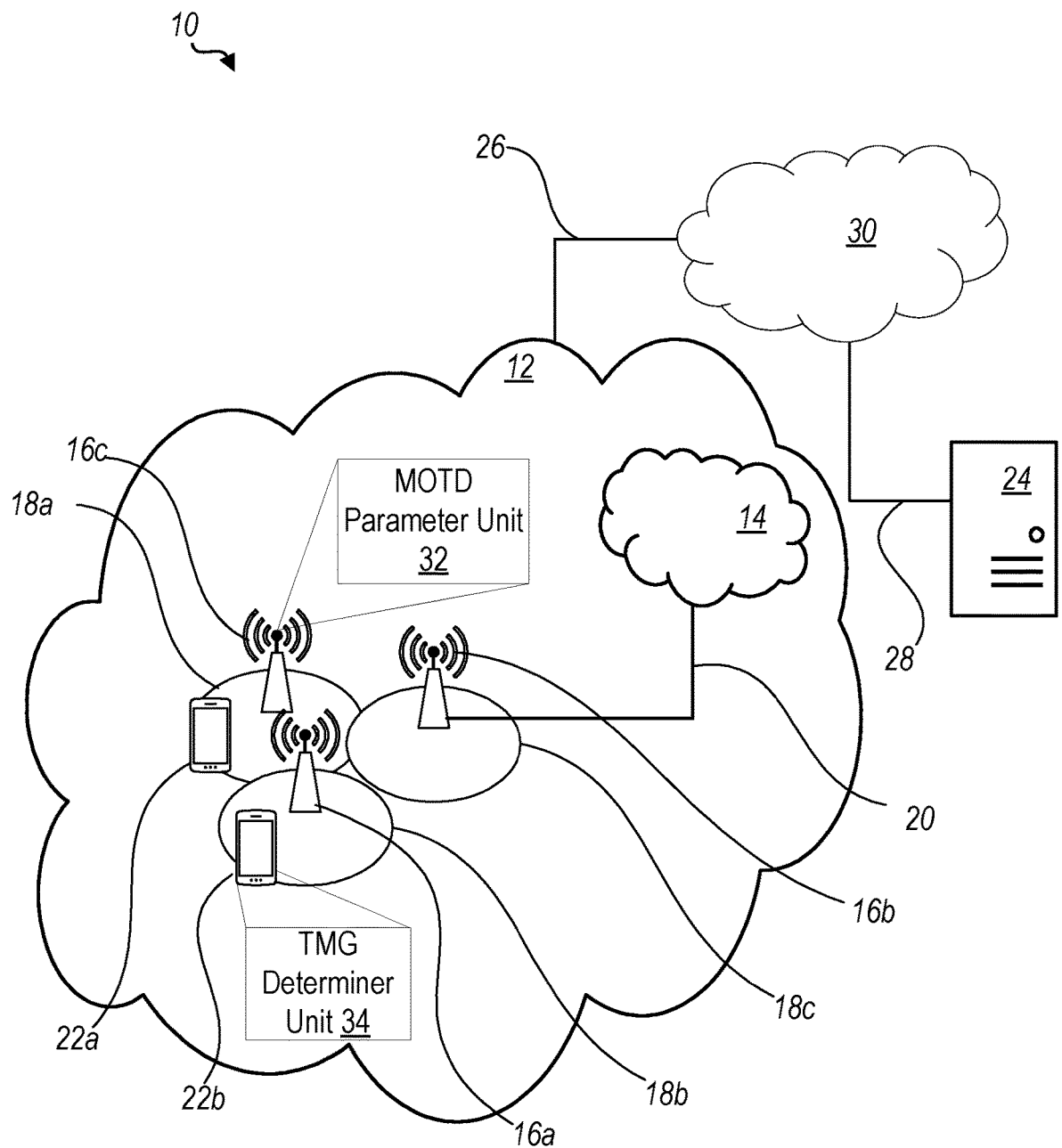
FIG. 5 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 5 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 5 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an MOTD Parameter unit 32 which is configured to determine a maximum operational time difference, MOTD, parameter based on a number (N) of transmit timing management groups (TMG) configured at a WD. A wireless device 22 is configured to include a TMG Determiner unit 34 which is configured to determine a number, N, of WD transmit timing management groups, TMGs, with which the WD is configured to operate a first signal, S1, and a second signal, S2, in a first cell and in a second cell, respectively.

Example implementations, in accordance with an embodiment, of the WD 22, network node 16 and host computer 24 discussed in the preceding paragraphs will now be described with reference to FIG. 6. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include MOTD Parameter unit 32 which is configured to determine a maximum operational time difference, MOTD, parameter based on a number (N) of transmit timing management groups (TMG) configured at a WD.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include TMG Determiner unit 34 which is configured to determine a number, N, of WD transmit timing management groups, TMGs, with which the WD is configured to operate a first signal, S1, and a second signal, S2, in a first cell and in a second cell, respectively.

Figure 6:
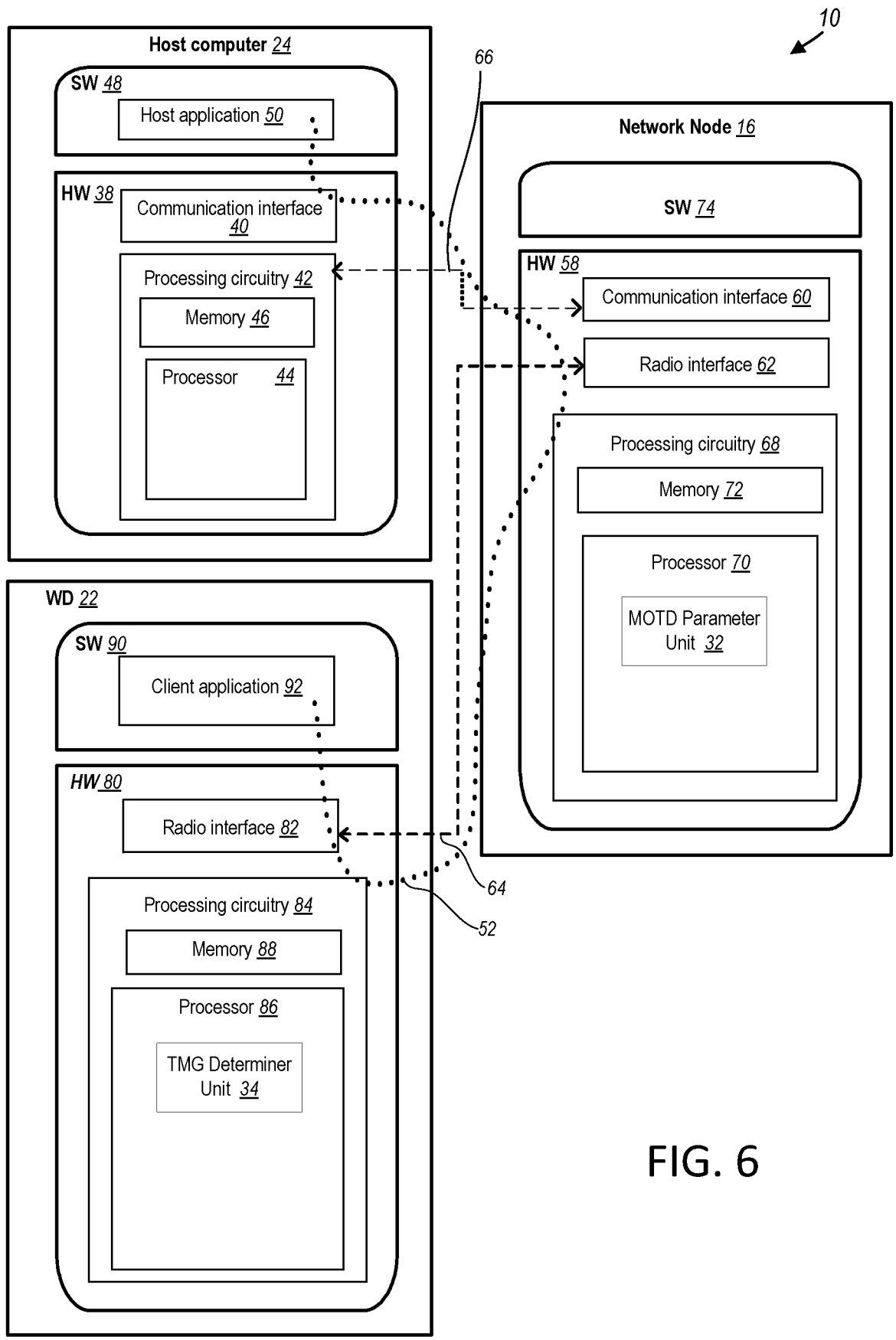
FIG. 6 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 6 and independently, the surrounding network topology may be that of FIG. 5.

In FIG. 6, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 5 and 6 show various "units" such as MOTD Parameter unit 32, and TMG Determiner unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 7 is a flowchart illustrating an exemplary method implemented in a communication system, such as, for example, the communication system of FIGS. 5 and 6, in accordance with one embodiment. The communication system may include a host computer 24, a network node 16 and a WD 22, which may be those described with reference to FIG. 6. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

FIG. 8 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 9 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 10 is a flowchart illustrating an exemplary method implemented in a communication system, such as, for example, the communication system of FIG. 5, in accordance with one embodiment. The communication system may include a host computer 24, a network node 16 and a WD 22, which may be those described with reference to FIGS. 5 and 6. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 11:
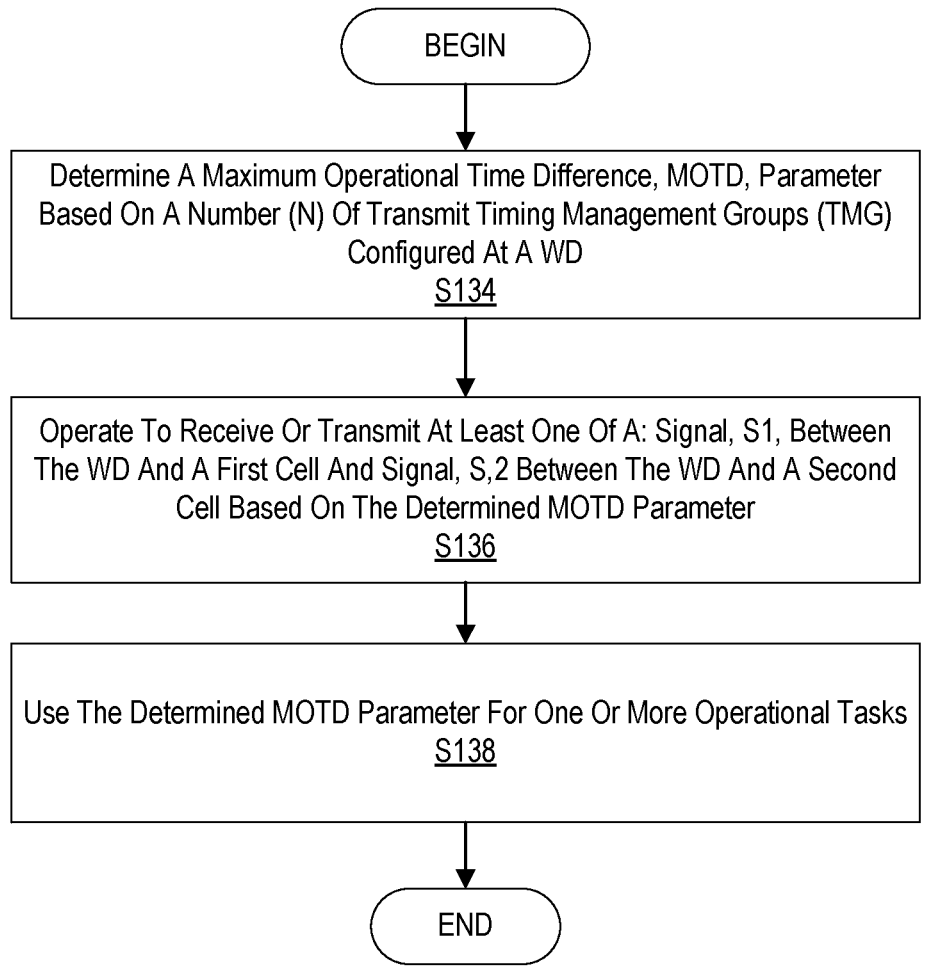
FIG. 11 is a flowchart of an exemplary process in a network node according to some embodiments of the present disclosure.

FIG. 11 is a flowchart of an exemplary process in a network node 16 according to some embodiments of the present disclosure. One or more Blocks and/or functions performed by network node 16 may be performed by one or more elements of network node 16 such as by MOTD parameter unit 32 in processing circuitry 68, processor 70, communication interface 60, radio interface 62, etc. The process includes determining, such as via the MOTD parameter unit 32, a maximum operational time difference, MOTD, parameter based on a number (N) of transmit timing management groups (TMG) configured at a WD 22 (Block S134). The process also includes operating, such as via the radio interface 62, to receive or transmit at least one of a: signal, S1, between the WD 22 and a first cell and signal, S2 between the WD 22 and a second cell based on the determined MOTD parameter (Block S136). The process further includes using, such as via the processing circuitry 68, the determined MOTD parameter for one or more operational tasks (Block S138).

Figure 12:
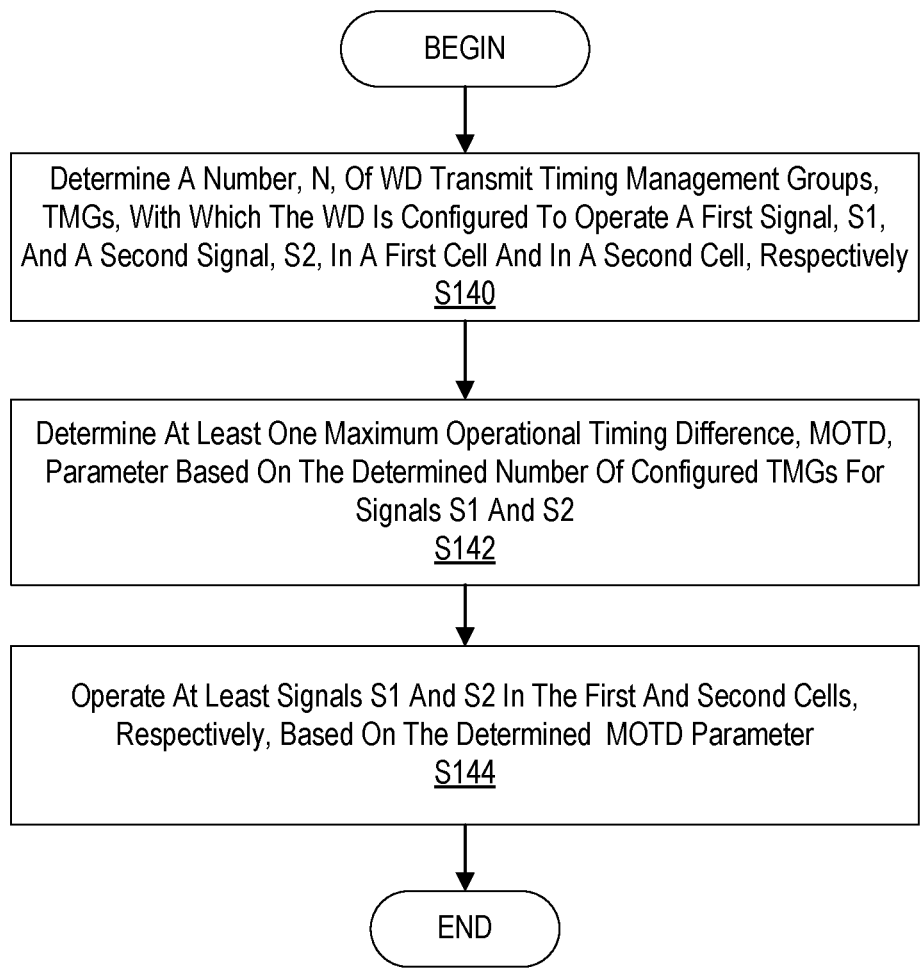
FIG. 12 is a flowchart of an exemplary process in a wireless device according to some embodiments of the present disclosure.

FIG. 12 is a flowchart of an exemplary process in a wireless device 22 according to some embodiments of the present disclosure. One or more Blocks and/or functions performed by wireless device 22 may be performed by one or more elements of wireless device 22 such as by TMG Determiner unit 34 in processing circuitry 84, processor 86, radio interface 82, etc. The process includes determining, such as via TMG Determiner unit 34, a number, N, of WD 22 transmit timing management groups, TMGs, with which the WD 22 is configured to operate a first signal, S1, and a second signal, S2, in a first cell and in a second cell, respectively (Block S140). The process also includes determining, such as via the processing circuitry 84, at least one maximum operational timing difference, MOTD, parameter based on the determined number of configured TMGs for signals S1 and S2 (Block S142). The process further includes operating, via the radio interface 82, at least signals S1 and S2 in the first and second cells, respectively, based on the determined MOTD parameter (Block S144).

Figure 13:
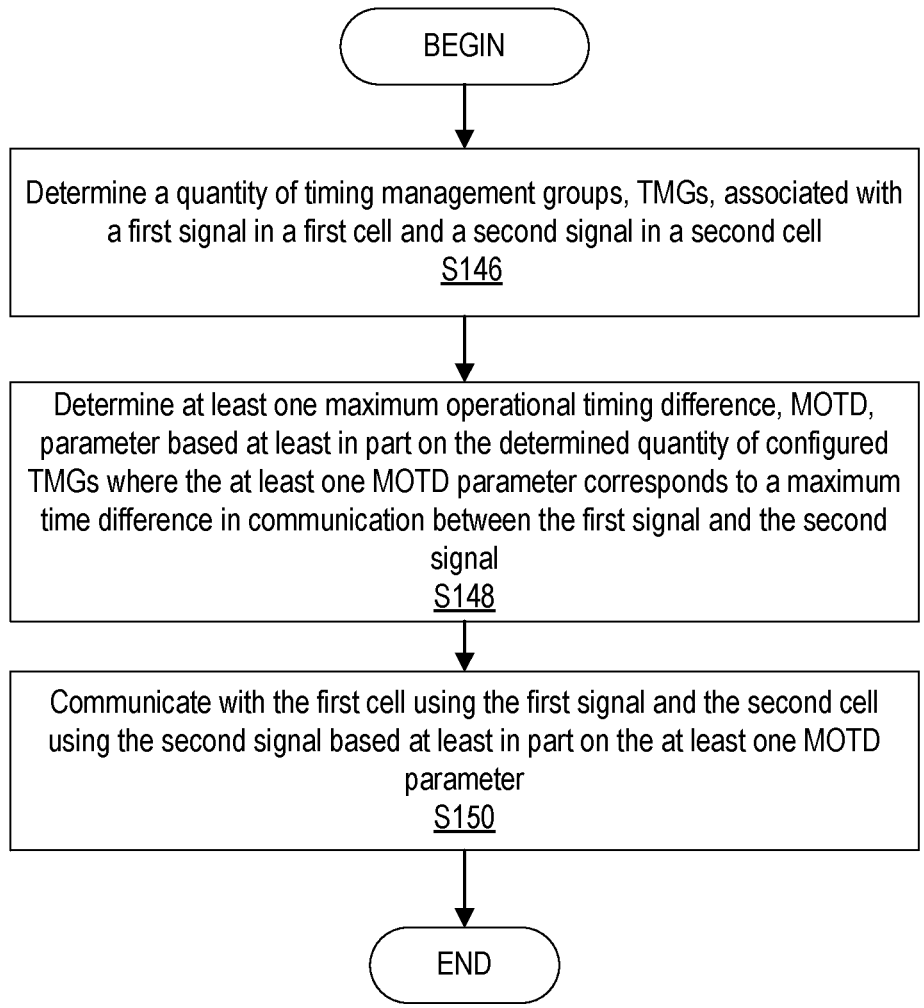
FIG. 13 is a flowchart of another exemplary process in a wireless device according to some embodiments of the present disclosure.

FIG. 13 is another flowchart of an exemplary process in a wireless device 22 according to some embodiments of the present disclosure. One or more Blocks and/or functions performed by wireless device 22 may be performed by one or more elements of wireless device 22, such as for example by TMG Determiner unit 34 in processing circuitry 84, processor 86, radio interface 82, etc. The wireless device 22 such as for example via one or more of processing circuitry 84, processor 86, radio interface 82, TMG Determiner unit 34, etc., is configured to determine (Block S146) a quantity of timing management groups, TMGs, associated with a first signal in a first cell and a second signal in a second cell, as described herein.

The wireless device 22 such as for example via one or more of processing circuitry 84, processor 86, radio interface 82, TMG Determiner unit 34, etc., is configured to determine (Block S148) at least one maximum operational timing difference, MOTD, parameter based at least in part on the quantity of TMGs where the at least one MOTD parameter corresponds to a maximum time difference in communication between the first signal and the second signal, as described herein. The wireless device 22 such as for example via one or more of processing circuitry 84, processor 86, radio interface 82, TMG Determiner unit 34, etc., is configured to communicate (Block S150) with the first cell using the first signal and the second cell using the second signal based at least in part on the at least one MOTD parameter, as described herein.

According to one or more embodiments, the quantity of TMGs is determined to be one TMG where the first cell and second cell are part of the one TMG. According to one or more embodiments of this aspect, the quantity of TMGs is determined to be greater than two TMGs where the at least one MOTD parameter corresponds to a plurality of MOTD parameters and each TMG operates according to a respective one of the plurality of MOTD parameters. According to one or more embodiments, the processing circuitry is further configured to: determine whether an estimate of a communication of the first signal and second signal exceeds the at least one MOTD parameter, and perform at least one operational task based at least in part on whether the estimate of the communication of the first signal and second signal exceeds the at least one MOTD parameter.

According to one or more embodiments, if the estimate of the communication of the first signal and second signal exceeds the at least one MOTD parameter, the at least one operational task includes at least one of: stopping multicarrier operation, releasing one of the first cell and second cell, discarding at least communication of at least one of the first signal and second signal and discarding at least one data block. According to one or more embodiments, if the estimate of the communication of the first signal and second signal does not exceed the at least one MOTD parameter, the at least one operational task includes at least one of: using a third cell for communication in addition to the first cell and second cell and resuming multicarrier operation.

According to one or more embodiments, the estimate of the communication of the first signal and second signal is an estimate of a magnitude of the time difference between the first signal and second signal. According to one or more embodiments, the estimate of the magnitude of the time difference between the first signal and the second signal corresponds to an estimate of one of a magnitude of a receive time difference between the first signal and the second signal and a magnitude of a transmit time difference between the first signal and the second signal. According to one or more embodiments of this aspect, the at least one MOTD parameter is one of a maximum receive time difference and maximum transmit time difference.

According to one or more embodiments of this aspect, the communicating with the first cell using the first signal and the second cell using the second signal is part of one of carrier aggregation and dual connectivity. According to one or more embodiments of this aspect, each TMG of the quantity of TMGs is a timing advance group that is associated with a set of timing parameters different from the at least one MOTD parameter for performing the communication with the first cell using the first signal and the second cell using the second signal. According to one or more embodiments of this aspect, the determination of the at least one MOTD parameter is further based at least in part on numerology associated with at least one carrier of at least one serving cell, at least one frequency range of at least one carrier of the at least one serving cell and a predefined relation between a plurality of carriers of a plurality of serving cells. According to one or more embodiments of this aspect, the quantity of TMGs associated with the first signal in the first cell and the second signal in the second cell corresponds to one of a quantity of TMGs the wireless device is configured to support and a quantity of TMGs the wireless device is able to support based on wireless device capability.

Having described the general process flow of arrangements of the disclosure and having provided examples of hardware and software arrangements for implementing the processes and functions of the disclosure, the sections below provide details and examples of arrangements for adaptation of maximum operational timing difference (MOTD) for intra-band multicarrier operation based on number of independent timing management groups. As used herein, "number" and "quantity" may be used interchangeably.

In some embodiments, a method in a WD 22 includes:
- Step-1: Determining such as for example via one or more of processing circuitry 84, processor 86, radio interface 82, TMG Determiner unit 34, etc., a number (N) of WD 22 transmit timing management groups (TMG) with which the WD 22 is configured to operate a first signal (S1) and a second signal (S2) in a first cell (cell1) and in a second cell (cell2), respectively;
- Step-2: Determining such as for example via one or more of processing circuitry 84, processor 86, radio interface 82, TMG Determiner unit 34, etc., at least one MOTD parameter based on the determined number of configured TMGs for operating signals, S1 and S2;
- Step-3: Operating such as for example via one or more of processing circuitry 84, processor 86, radio interface 82, TMG Determiner unit 34, etc., at least signals (S1 and S2) in cell1 and cell2 respectively based on the determined MOTD parameter; and
- Step-4: (optional): Using such as for example via one or more of processing circuitry 84, processor 86, radio interface 82, TMG Determiner unit 34, etc., the determined MOTD parameter for one or more operational tasks on at least one operational frequency e.g. stopping or resuming multicarrier operation, uplink feedback transmission, demodulation, CSI measurements, etc.

As used herein in one or more embodiments, an MOTD may refer to one or more MOTD parameters such as one or more MOTD values that are described herein.

Step-1

In this step the WD 22 may obtain or determine such as for example via one or more of processing circuitry 84, processor 86, radio interface 82, TMG Determiner unit 34, etc., information about the number (N) of WD 22 transmit timing management groups (TMG) with which the WD 22 is configured to operate a first signal (S1) and a second signal (S2) in at least a first cell (cell1) and in at least a second cell (S2) respectively. The WD 22 may be configured with at least two serving cells: cell1 and cell2. As an example, cell1 and cell2 are PCell and SCell respectively in CA, or PCell and PSCell respectively in DC, etc. The WD 22 may further be configured with more serving cells. The number of TMGs can be any number from 1 to any other integer value larger than 1 e.g. N=1, 2, 3, 4, . . . etc. An example of a TMG is timing advance group (TAG). Specific examples of TAGs include but are not limited to pTAG, sTAG, psTAG, etc.

In one TMG, the WD 22 may maintain such as for example via one or more of processing circuitry 84, processor 86, radio interface 82, TMG Determiner unit 34, etc., one transmit timing parameter for transmitting uplink signals for serving cells configured in that TMG. Examples of transmit timing parameters include but are not limited to WD 22 initial transmit timing, timing advance value, etc. For example, the initial transmit timing may be obtained by the WD 22 autonomously such as for example via one or more of processing circuitry 84, processor 86, radio interface 82, TMG Determiner unit 34, etc., based on the reception timing of the downlink signals (e.g. reference signals such as SSB, CSI-RS, TRS, etc.) from the cell (e.g. PCell, PSCell, etc.) at the WD 22. The timing advance (TA) may be obtained by the WD 22 such as for example via one or more of processing circuitry 84, processor 86, radio interface 82, TMG Determiner unit 34, etc., by receiving the TA command or message from the network node 16 e.g. from PCell, PSCell, etc. The received TA command may be valid for certain time period, e.g., until the expiration of the TA timer, etc. The WD 22 may use initial transmit timing for transmitting uplink signals if it does not have a valid TA command e.g., for transmitting random access, for transmission after long WD 22 inactivity such as after DRX OFF period, etc. But the WD 22 may use TA command for transmitting uplink signals when it has a valid TA command.

For simplicity of explanation it is assumed that the WD 22 can be configured with N=1 TMG or N>1 TMGs (e.g. N=2). The WD 22 can be configured with N TMGs by the network node 16 e.g. by receiving a message from the network node 16. In one example, the WD 22 may receive the message via a serving cell (e.g. PCell) which is managed or served by the network node 16.

In a first TMG configuration example it is assumed that the WD 22 is configured with 1 TMG, e.g., with only pTAG. In this case the WD 22 uses such as for example via one or more of processing circuitry 84, processor 86, radio interface 82, TMG Determiner unit 34, etc. the same set of timing parameters (e.g., initial timing, TA, etc.) for operating signals, S1 and S2 in cell1 and cell2, respectively. All the serving cells (e.g., cell1 and cell2) of the WD 22 may be configured in the same one TMG. In one example, the WD 22 configured with 1 TMG can be capable of only 1 TMG. In another example, the WD 22 configured with 1 TMG may be capable of multiple TMGs, e.g., pTAG and one or more sTAGs in CA or pTAG and psTAG in DC or pTAG, psTAG and one or more sTAG in multi-connectivity. In this case, the network node 16 may decide to configure the WD 22 with 1 TMG for example based on deployment scenario. For example, if cell1 and cell2 are physically co-located at the same site or location then the network node 16 may decide to configure the WD 22 with single TMG even though it supports more than one TMG. In such deployment scenario the propagation delay between the WD 22 and cell1 is the same or very similar to the propagation delay between the WD 22 and cell2.

In a second TMG configuration example it is assumed that the WD 22 is configured with multiple TMG, e.g., with two TMGs. In this case the WD 22 uses such as for example via one or more of processing circuitry 84, processor 86, radio interface 82, TMG Determiner unit 34, etc., a first set of timing parameter (e.g., initial timing, TA, etc.) for operating signal, S1, in at least cell1 and a second set of timing parameter (e.g., initial timing, TA, etc.) for operating signal, S2, in at least cell2. In one example, the WD 22 is configured (N-M) TMG (e.g. 2 TAGs) can be capable of N TMG (e.g.

N=3). In another example the WD 22 configured with N TMG can be capable of N TMG.

The WD 22 transmit timing management determines such as for example via one or more of processing circuitry 84, processor 86, radio interface 82, TMG Determiner unit 34, etc., whether the WD 22 is able to handle different received or transmitted carriers using separate timing procedures or not. One possible reason for such WD 22 procedure is related to the implementation model in the WD 22, e.g., transmitter and/or receiver architecture in the WD 22.

As an example embodiment, when a WD 22 uses such as for example via one or more of processing circuitry 84, processor 86, radio interface 82, TMG Determiner unit 34, etc., a single PA and single IFFT for processing multiple aggregated carriers, then the WD 22 is only capable of processing one UL timing management.

As seen from the above, the MOTD may be defined as the timing difference experienced at the WD 22 at the transmitter or receiver. Similar timing restrictions as above can exist at the WD 22 receiver, e.g., like a single FFT.

The WD 22 timing management may define a timing procedure with which the WD 22 operates signals either at the DL or in UL. Thus, the WD 22 timing management can be associated with the WD 22 timing in DL and/or in UL.

The WD 22 timing management can be determined in many different ways, including but not limited to:

As an example embodiment, the WD 22 may determine such as for example via one or more of processing circuitry 84, processor 86, radio interface 82, TMG Determiner unit 34, etc., this timing management autonomously, based on the WD 22 RF implementation. Another example of this can be that, WD 22 receives such as for example via one or more of processing circuitry 84, processor 86, radio interface 82, TMG Determiner unit 34, etc., notifications from network node 16 related to the number of TMGs to be used, configuration received from the network node 16 e.g. PCell, SCell, PSCell, etc. For example the WD 22 may determine such as for example via one or more of processing circuitry 84, processor 86, radio interface 82, TMG Determiner unit 34, etc., the TMG used in any time instance in any carrier by receiving control signals in DL (e.g. on PDCCH) or by receiving higher layer message such as the RRC message In another example, the WD 22 and network nodes 16 are aware of the WD 22 TMG capability based on a predefined number.

In another example, the configured number of the WD 22's TMG is based on certain WD 22 capability, such as WD 22 is capable of using multiple timing advance or not.

In some example embodiments, the WD 22 timing management can be different for different aggregated carriers, as an example, two carriers which are intra-band, they can use same timing, while two carriers who are in different bands can use different timing.

In some example embodiments, the WD 22 timing management can be different for different aggregation mechanisms, such as CA or DC.

Step-2

In this step the WD 22 obtains or determines such as for example via one or more of processing circuitry 84, processor 86, radio interface 82, TMG Determiner unit 34, etc., an MOTD parameter value to be used for operating signals (e.g. transmission or reception) in the serving cells based on the number of the TMGs configured at the WD 22. The MOTD parameter herein comprises at least one of: a receive time difference between signals from the serving cells belonging to their respective aggregated carriers and a transmission time difference between signals transmitted to the serving cells belonging to the aggregated carriers.

According to this embodiment the MOTD parameter is determined by the WD 22 based on the association or relation between the MOTD parameter and the number of the WD 22 transmit timing management groups with which the WD 22 can be configured as described in Step-1 above. The relation or association or mapping between the MOTD and the number of configured TMGs can be pre-defined, or it can be configured by the network node 16.

The relation between MOTD and the number of TMGs with which the WD 22 is configured can be expressed by function. One example of a general function for determining the MOTD can be expressed by (1):

$$\text{MOTD}=f(K1,K2,K3,K4) \quad (1)$$

In (1) K1, K2 and K3 are defined as follows, as examples,

K1 represents number of OFDM symbols, which is a function of the numerology e.g. subcarrier spacing used in one or more carriers of the serving cells involved in the multicarrier operation;

K2 represents WD 22 capability in terms of number of TMGs which the WD 22 supports. K2 may also represent the actual number of the TMGs configured at the WD 22 and is equal to or less than the maximum number of TMGs supported by the WD 22;

K3 represents the frequency range(s) of one or more carriers of the serving cells involved in the multicarrier operation, e.g., it can be FR1 or FR2;

K4 represents the relation between the carrier frequencies of carriers of the serving cells involved in the multi-carrier operation. For example, K4 denotes whether the carriers belong to the same frequency bands, or whether they belong to different frequency bands, or in scenario when the carriers belong to same frequency band whether the carriers are adjacent carriers with respect to each other or non-adjacent carriers.

Specific examples of MOTD are MRTD, MTTD, etc. Examples of operation are reception of signals (e.g., S1 and S2) at the WD 22 from a first node (Node') and a second node (Node2) respectively, transmission of signals (e.g., S1 and S2) to Node1 and Node2, respectively.

In one example MRTD and MTTD can be related to each other. For example, the WD 22 derives such as for example via one or more of processing circuitry 84, processor 86, radio interface 82, TMG Determiner unit 34, etc., MTTD based on MOTD which in turn is determined based on the relation as described above. For example, the following relation can be used for deriving MTTD from MRTD:

MOTD=MRTD

MTTD=f(MTD, Z1), where Z1 is the WD 22 UL transmission accuracy levels. As an example, MTTD=MRTD+Z1.

Several examples of the relation between the MOTD and TMGs are given below.

In one example the WD 22 is able to operate signals with MOTD of up to T2 μs provided that the WD 22 is configured with only one TMG for all serving cells involved in multi-carrier operation, otherwise if the WD 22 is configured with multiple TMGs then the WD 22 is able to operate signals with MOTD of up to T1 μs, where magnitude of T1<magnitude of T2. In one specific example the WD 22 is configured with 2 TMGs, e.g., with pTAG and sTAG in CA, or with pTAG and psTAG in DC, etc. This is shown in table 3 and table 4 for MOTD being MRTD and MTTD respectively. The MOTD is denoted by T1 and T2 for the case when MOTD is MRTD. The MOTD is denoted by T1' and T2' for the case when MOTD is MTTD. Examples of T1 and T2 are 260 ns and 3 μs respectively for MOTD being MRTD. Examples of T1' and T2' are 2.47 μs and 5.21 μs respectively for MOTD being MTTD. A specific example of the relation between the number of TMGs and the MOTD being MRTD is shown in table 5. A specific example of the relation between the number of TMGs and the MOTD being MTTD is shown in table 6.

TABLE 2

| Scenario | Number of configured TMGs | MOTD |
| --- | --- | --- |
| 0 | 1 | T1 |
| 1 | N; N > 1 | T2; T1 < T2 |

TABLE 3

| Scenario | Number of configured TAGs | MRTD |
| --- | --- | --- |
| 0 | 1 | T1 |
| 1 | 2 | T2; T1 < T2 |

TABLE 4

| Scenario | Number of configured TAGs | MTTD |
| --- | --- | --- |
| 0 | 1 | T1' |
| 1 | 2 | T2'; T1' < T2' |

TABLE 5

| Scenario | Number of configured TAGs | MRTD |
| --- | --- | --- |
| 0 | 1 | 260 ns |
| 1 | 2 | 3 μs |

TABLE 6

| Scenario | Number of configured TAGs | MTTD |
| --- | --- | --- |
| 0 | 1 | 2.47 μs |
| 1 | 2 | 5.21 μs |

The relation between the number of TMGs and the MOTD may further depend on the numerology of the signals operated by the WD 22 in its serving cells involve in multicarrier operations, e.g., SCS of the signals operated by the WD 22 in cell1 and cell2. For example, the MOTD may depend on whether the carriers involved in the multicarrier operation have the same numerology or have different numerologies, e.g., cell1 and cell2 operate using 15 KHz SCS or cell1 and cell2 operate using 15 KHz SCS and 30 KHz SCS, respectively. The relation between the number of TMGs and the MOTD may further depends on the frequency relation of the carrier frequencies of the WD 22's serving cells involve in multicarrier operations. For example, the MOTD may depend on whether the carriers involved in the multicarrier operation are in the same frequency band or in different frequency bands. In yet another example the MOTD may depend on whether the carriers are the same frequency band are adjacent with respect to each other or are non-adjacent with respect to each other. The above description is illustrated by an example in table 7 for MRTD. The above description is further illustrated by an example in table 8 for MTTD.

TABLE 7

| Sub-carrier spacing in E-UTRA PCell (kHz) | DL Sub-carrier spacing in PSCell (kHz) Note1 | Maximum receive timing difference (μs) |
| --- | --- | --- |
| 15 | 15 | 3, 0.26[1] |
| 15 | 30 | 3 |
| 15 | 60 | 3 |

Note1:
DL Sub-carrier spacing is min {$SCS_{SS}$, $SCS_{DATA}$}.
Note2:
This is applicable for WDs that is only capable of handling a single UL timing for E-UTRA and NR cell.

TABLE 8

| Sub-carrier spacing in E-UTRA PCell (kHz) | DL Sub-carrier spacing in PSCell (kHz) Note1 | Maximum transmission timing difference (μs) |
| --- | --- | --- |
| 15 | 15 | 5.21, 2.47[1] |
| 15 | 30 | 5.21 |
| 15 | 60 | 5.21 |

Note1:
UL Sub-carrier spacing is min {$SCS_{SS}$, $SCS_{DATA}$}.
NOTE 2:
This is applicable for WDs that is only capable of handling a single UL timing for E-UTRA and NR cell.

Step-3

In this step the WD 22 uses such as for example via one or more of processing circuitry 84, processor 86, radio interface 82, TMG Determiner unit 34, etc., the determined value of the MOTD in Step-2 for operating signals (e.g., receiving and/or transmitting) signals in serving cells configured for the multicarrier operation e.g. in at least cell1 and cell2. The WD 22 can receive and/or transmit such as for example via one or more of processing circuitry 84, processor 86, radio interface 82, TMG Determiner unit 34, etc., signals with respect to cells within the configured CA configuration (e.g., number of serving cells in the same or different based on the determined value of the MOTD parameter.

For example, the WD 22 may receive and process such as for example via one or more of processing circuitry 84, processor 86, radio interface 82, TMG Determiner unit 34, etc., the received signals (S1 and S2) from cell1 and cell2 provided that the magnitude of the received difference (ΔR) between S1 and S1 received at the WD 22 does not exceed the determined value of MOTD i.e. the MOTD threshold, e.g., MRTD. In yet another example, the WD 22 may further process and transmit such as for example via one or more of processing circuitry 84, processor 86, radio interface 82, TMG Determiner unit 34, etc., signals on cell1 and/or on cell2 provided that the magnitude of the estimated transmission time difference (ΔT) does not exceed the determined value of MOTD, i.e., the MOTD threshold, e.g., MTTD.

Step-4

In this step which is optional for the WD 22, the WD 22 may use the determined MOTD parameter for performing such as for example via one or more of processing circuitry 84, processor 86, radio interface 82, TMG Determiner unit 34, etc., one or more operational tasks. Examples of operational tasks include but are not limited to:

stopping multicarrier operation. For example, if the estimated ΔR and/or ΔT are larger than their determined MOTD thresholds, then the WD 22 may not apply the CA configuration for cell1 and cell2, deconfiguring, releasing or deactivating cell(s). For example if the estimated ΔR and/or ΔT are larger than their determined MOTD thresholds, then the WD 22 may deconfigure, release or deactivate such as for example via one or more of processing circuitry 84, processor 86, radio interface 82, TMG Determiner unit 34, etc., at least one of cell1 and cell2, activating cell(s). For example if the estimated ΔR and/or ΔT are not larger than their determined MOTD thresholds, then the WD 22 may activate such as for example via one or more of processing circuitry 84, processor 86, radio interface 82, TMG Determiner unit 34, etc., at least one of deactivated cell1 and deactivated cell2, resuming multicarrier operation. For example if the estimated ΔR and/or ΔT is not larger than their determined MOTD thresholds, then the WD 22 may apply such as for example via one or more of processing circuitry 84, processor 86, radio interface 82, TMG Determiner unit 34, etc., the CA configuration for cell1 and cell2, drop or discard such as for example via one or more of processing circuitry 84, processor 86, radio interface 82, TMG Determiner unit 34, etc., one or more receptions and/or transmission of signals if the estimated ΔR and/or ΔT are larger than their determined MOTD thresholds, release or discard such as for example via one or more of processing circuitry 84, processor 86, radio interface 82, TMG Determiner unit 34, etc., one or more data block or packets stored in the memory (e.g. most recently stored blocks) if the estimated ΔR and/or ΔT are larger than their determined MOTD thresholds, uplink feedback transmission such as for example via one or more of processing circuitry 84, processor 86, radio interface 82, TMG Determiner unit 34, etc., e.g. ACK/NACK related to DL reception on cell1 and/or cell2, demodulation of DL channels such as for example via one or more of processing circuitry 84, processor 86, radio interface 82, TMG Determiner unit 34, etc., performing CSI measurements on cell1 and/or on cell2 such as for example via one or more of processing circuitry 84, processor 86, radio interface 82, TMG Determiner unit 34, etc.

reporting results of measurements, e.g., CQI to network node 16, such as for example via one or more of processing circuitry 84, processor 86, radio interface 82, TMG Determiner unit 34, etc.

Methods in a network node 16 of adapting operation based on MOTD parameter

Similarly, some embodiments include several methods in the network node 16, which consists of several embodiments related to method in network node 16 as described below.

A method in a network node 16 may comprise:

Step-1: Determining such as for example via one or more of processing circuitry 68, processor 70, radio interface 62, MOTD parameter unit 32, etc., a maximum operational time difference (MOTD) parameter based on a number (N) of transmit timing management groups (TMG) configured at a WD 22.

Step-2: Operating (e.g. transmitting and/or receiving) such as for example via one or more of processing circuitry 68, processor 70, radio interface 62, MOTD parameter unit 32, etc., at least one of the: signal, S1 between the WD 22 and cell1 and signal, S2 between the WD 22 and cell2 based on the determined MOTD parameter in Step-2.

Step-3 (optional): Using such as for example via one or more of processing circuitry 68, processor 70, radio interface 62, MOTD parameter unit 32, etc., the determined MOTD parameter for one or more operational tasks e.g. stopping or resuming multicarrier operation, scheduling, configuration, activation/deactivation etc.

Step-1

In this step the network node 16 determines such as for example via one or more of processing circuitry 68, processor 70, radio interface 62, MOTD parameter unit 32, etc., a number (N) of the WD 22 transmit timing management groups (TMG) configured at the WD 22.

The determination can be based on one or more criteria. Any of the following non-limiting examples are valid:

As an example embodiment, the network node 16 may be informed (e.g. via RRC signaling) by the WD 22 regarding the number of TMGs that it can support for one or more multicarrier operations e.g. for carrier aggregation, dual connectivity etc. The capability may further indicate the band combination for which the WD 22 supports certain number of TMGs, e.g., N=2 for intra-band contiguous CA.

In another example embodiment, the network node 16 may use such as for example via one or more of processing circuitry 68, processor 70, radio interface 62, MOTD parameter unit 32, etc., predefined information to determine the WD 22 TMG capability, such as intra-band aggregation will use same timing (e.g. N=1) while inter-band aggregation to use different timing (e.g. N>1 such as N=2), etc.

In another example, the WD 22 TMG capability may depend on the aggregation method or type of multicarrier operation, such as CA or DC or multi-connectivity.

In yet another example the network node 16 determines such as for example via one or more of processing circuitry 68, processor 70, radio interface 62, MOTD parameter unit 32, etc., the current or actual number of configured TMGs at the WD 22. For example, number (N) of WD 22 transmit timing management groups (TMG) is less than or equal to the WD 22 capability in terms of the maximum number of the supported TMGs.

Before determining the value of N the same network node 16 may also configure such as for example via one or more of processing circuitry 68, processor 70, radio interface 62, MOTD parameter unit 32, etc., the WD 22 with a number (N) of WD 22 transmit timing management groups (TMG). In this case the network node 16 is aware of the value of N. The network node 16 may choose such as for example via one or more of processing circuitry 68, processor 70, radio interface 62, MOTD parameter unit 32, etc., the value of N based on the WD 22 capability in terms of the maximum number of the supported TMGs. For example, the network node 16 configures the WD 22 with the number of the TMGs that does not exceed the WD 22 capability in terms of the maximum number of the supported TMGs.

Once the number of the WD 22's TMGs is determined, the network node 16 may also determine such as for example via one or more of processing circuitry 68, processor 70, radio interface 62, MOTD parameter unit 32, etc., a maximum operational time difference (MOTD) parameter based on the configured values of WD 22's TMG operating in multicarrier operational mode. The determination of the MOTD can be based on the relation or association between the MOTD and the number of TMGs of the WD 22. The network node 16 may determine such as for example via one or more of processing circuitry 68, processor 70, radio interface 62, MOTD parameter unit 32, etc., the MOTD based on one or more rules as described above with respect to WD 22. The function and examples described above are also applicable for the method in the network node 16.

Step-2

In this step the network node 16 operates (e.g., transmits and/or receives) such as for example via one or more of processing circuitry 68, processor 70, radio interface 62, MOTD parameter unit 32, etc., at least one of the signals, S1 between the WD 22 and cell1 and S2 between the WD 22 and cell1, based on the determined value of the MOTD in Step-1, e.g., maximum operational time difference (MRTD), MTTD, etc. For example, the network node 16 ensures that the transmitted signals S1 and S2 from cell1 and cell2, respectively, are received at the WD 22 within the determined MOTD value, e.g., MRTD=µs if the WD 22 is configured with 2 TMGs in intra-band CA or DC. For example, if the magnitude of the received time difference (ΔR) of the signals S1 and S2 at the WD 22 is expected to exceed the magnitude of MRTD then the network node 16 may transmit such as for example via one or more of processing circuitry 68, processor 70, radio interface 62, MOTD parameter unit 32, etc., S1 and S2 to the WD 22 in different time resources, e.g., S1 and S1 in slot 0 and slot 5 respectively. The network node 16 may determine such as for example via one or more of processing circuitry 68, processor 70, radio interface 62, MOTD parameter unit 32, etc., the value of ΔR by receiving it from the WD 22 or autonomously in the network node 16 or based on historical data or statistics Step-3

In this step which is optional for the network node 16, the network node 16 may use such as for example via one or more of processing circuitry 68, processor 70, radio interface 62, MOTD parameter unit 32, etc., the determined MOTD parameter for performing one or more operational tasks. Examples of operational tasks include but are not limited to:

- stopping multicarrier operation such as for example via one or more of processing circuitry 68, processor 70, radio interface 62, MOTD parameter unit 32, etc. For example if the estimated ΔR and/or ΔT are larger than their determined MOTD thresholds, then the network node 16 may stop such as for example via one or more of processing circuitry 68, processor 70, radio interface 62, MOTD parameter unit 32, etc., the multicarrier operation for the WD 22 involving stopping multicarrier operation.
- deconfiguring, reconfigure, releasing or deactivating cell(s) such as for example via one or more of processing circuitry 68, processor 70, radio interface 62, MOTD parameter unit 32, etc. For example, if the estimated ΔR and/or ΔT are larger than their determined MOTD thresholds, then the network node 16 may deconfigure, release or deactivate at least one of cell1 and cell2 such as for example via one or more of processing circuitry 68, processor 70, radio interface 62, MOTD parameter unit 32, etc. The network node 16 may instead reconfigure such as for example via one or more of processing circuitry 68, processor 70, radio interface 62, MOTD parameter unit 32, etc., another cell, e.g., a third cell (cell3).
- activating cell(s) such as for example via one or more of processing circuitry 68, processor 70, radio interface 62, MOTD parameter unit 32, etc. For example, if the estimated ΔR and/or ΔT are not larger than their determined MOTD thresholds, then the network node 16 may activate such as for example via one or more of processing circuitry 68, processor 70, radio interface 62, MOTD parameter unit 32, etc., at least one of deactivated cell1 and deactivated cell2,
- resuming multicarrier operation. For example if the estimated ΔR and/or ΔT is not larger than their determined MOTD thresholds, then the WD 22 may apply such as for example via one or more of processing circuitry 84, processor 86, radio interface 82, TMG Determiner unit 34, etc., the CA configuration for cell1 and cell2,
- configuration for cell1 and cell2 such as for example via one or more of processing circuitry 68, processor 70, radio interface 62, MOTD parameter unit 32, etc.,
- deconfiguring, releasing or deactivating cell(s) such as for example via one or more of processing circuitry 68, processor 70, radio interface 62, MOTD parameter unit 32, etc. For example, if the estimated ΔR and/or ΔT are larger than their determined MOTD thresholds, then the WD 22 may deconfigure, release or deactivate at least one of cell1 and cell2 such as for example via one or more of processing circuitry 84, processor 86, radio interface 82, TMG Determiner unit 34, etc.,
- activating cell(s) such as for example via one or more of processing circuitry 68, processor 70, radio interface 62, MOTD parameter unit 32, etc. For example if the estimated ΔR and/or ΔT are not larger than their determined MOTD thresholds, then the WD 22 may activate such as for example via one or more of processing circuitry 84, processor 86, radio interface 82, TMG Determiner unit 34, etc., at least one of deactivated cell1 and deactivated cell2,
- resuming multicarrier operation. For example, if the estimated ΔR and/or ΔT is not larger than their determined MOTD thresholds, then the network node 16 may reconfigure such as for example via one or more of processing circuitry 68, processor 70, radio interface 62, MOTD parameter unit 32, etc., previously deconfigured cell1 and/or cell2,
- modifying numerologies of cell1 and/or of cell2 such as for example via one or more of processing circuitry 68, processor 70, radio interface 62, MOTD parameter unit 32, etc. For example if the estimated ΔR and/or ΔT are larger than their determined MOTD thresholds, then the network node 16 may change such as for example via one or more of processing circuitry 68, processor 70, radio interface 62, MOTD parameter unit 32, etc., the numerologies of cell1 and/or of cell2 e.g. change SCS1 of cell1 and/or SCS2 of cell2. This in turn may change MOTD. Depending on the new values of SCS1 and/or SCS2 their change may enable the WD 22 to operate with larger value of MOTD Some advantages of some embodiments may include but are not limited to:

- The WD 22 behavior with respect to maximum operational timing window is well defined for different WD 22 transmit timing management
- The WD 22 behavior with respect to maximum operational timing window is well defined when network assigns the aggregation feature for the WD 22
- The WD 22 behavior with respect to maximum operational timing window is well defined when different WD 22 transmit timing management is used in different carriers in CA (or DC) operation.

Optimized service dependent base station TAE capability and WD 22 capability i.e., base stations lacking very accurate TAE can still be based on WD 22 capability reporting support for some WD 22s. The TAE of a base stations can change over time during e.g. holdover operation when the base station temporarily loses its synchronization source (e.g. GPS sync source being jammed)

EXAMPLES

Example A1. A network node 16 configured to communicate with a wireless device 22 (WD 22), the network node 16 configured to, and/or comprising a radio interface 62 and/or comprising processing circuitry 68 configured to:

determine a maximum operational time difference, MOTD, parameter based on a number (N) of transmit timing management groups (TMG) configured at a WD 22;

operate to receive or transmit at least one of a: signal, S1, between the WD 22 and a first cell and signal, S2, between the WD 22 and a second cell based on the determined MOTD parameter; and use the determined MOTD parameter for one or more operational tasks.

Example A2. The network node 16 of Example A1, wherein an operational task includes stopping or resuming multicarrier operation.

Example B1. A method implemented in a network node 16, the method comprising:

determining a maximum operational time difference, MOTD, parameter based on a number (N) of transmit timing management groups, TMG, configured at a WD 22;

operating to receive or transmit at least one of a: signal, S1, between the WD 22 and a first cell and signal, S2 between the WD 22 and a second cell based on the determined MOTD parameter; and using the determined MOTD parameter for one or more operational tasks.

Example B2. The method of Example B1, wherein an operational task includes stopping or resuming multicarrier operation.

Example C1. A wireless device 22 (WD 22) configured to communicate with a network node 16, the WD 22 comprising processing circuitry 84 configured to:

determine at least one maximum operational timing difference, MOTD, parameter based at least in part on a number, N, of WD transmit timing management groups, TMGs, with which the WD 22 is configured to communicate with a first cell and a second cell for multicarrier operation; and communicate with the first cell and second cell based at least in part on the MOTD parameter.

Example C2. The WD 22 of Example C1, further comprising using the determined MOTD parameter for one or more operational tasks on at least one operation frequency.

Example C3. The WD 22 of Example C1, wherein an operational task includes stopping or resuming multicarrier operation.

Example C4. The WD 22 of Example C1, wherein an operation task includes uplink feedback transmission.

Example D1. A method implemented in a wireless device 22 (WD 22), the method comprising:

determining a number, N, of WD 22 transmit timing management groups, TMGs, with which the WD 22 is configured to operate a first signal, S1, and a second signal, S2, in a first cell and in a second cell, respectively;

determining at least one maximum operational timing difference, MOTD, parameter based on the determined number of configured TMGs for signals S1 and S2;

operating at least signals S1 and S2 in the first and second cells, respectively, based on the determined MOTD parameter.

Example D2. The method of Example D1, further comprising using the determined MOTD parameter for one or more operational tasks on at least one operation frequency.

Example D3. The method of Example D1, wherein an operational task includes stopping or resuming multicarrier operation.

Example D4. The method of Example D1, wherein an operation task includes uplink feedback transmission.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device configured to communicate with a network node, the wireless device comprising processing circuitry configured to:
   determine a quantity of timing management groups (TMGs) associated with a first signal in a first cell and a second signal in a second cell;
   determine at least one maximum operational timing difference (MOTD) parameter based at least in part on the quantity of TMGs, the at least one MOTD parameter corresponding to a maximum time difference in communication between the first signal and the second signal; and
   communicate with the first cell using the first signal and the second cell using the second signal based at least in part on the at least one MOTD parameter, wherein the quantity of TMGs is determined to be one TMG where the first cell and the second cell being part of the one TMG, and
   wherein the quantity of TMGs is determined to be greater than two TMGs where the at least one MOTD parameter corresponding to a plurality of MOTD parameters, and each TMG operating according to a respective one of the plurality of MOTD parameters.

2. The wireless device of claim 1, wherein the processing circuitry is further configured to:
   determine whether an estimate of a communication of the first signal and the second signal exceeds the at least one MOTD parameter; and
   perform at least one operational task based at least in part on whether the estimate of the communication of the first signal and the second signal exceeds the at least one MOTD parameter.

3. The wireless device of claim 2, wherein if the estimate of the communication of the first signal and the second signal exceeds the at least one MOTD parameter, the at least one operational task includes at least one of:
   stopping multicarrier operation;
   releasing one of the first cell and the second cell;
   discarding at least communication of at least one of the first signal and the second signal; and
   discarding at least one data block.

4. The wireless device of claim 2, wherein if the estimate of the communication of the first signal and the second signal does not exceed the at least one MOTD parameter, the at least one operational task includes at least one of:
   using a third cell for communication in addition to the first cell and the second cell; and
   resuming multicarrier operation.

5. The wireless device of claim 2, wherein the estimate of the communication of the first signal and the second signal is an estimate of a magnitude of the time difference between the first signal and the second signal, and/or wherein the estimate of the magnitude of the time difference between the first signal and the second signal corresponds to an estimate of one of a magnitude of a receive time difference between the first signal and the second signal and a magnitude of a transmit time difference between the first signal and the second signal.

6. The wireless device of claim 1, wherein the at least one MOTD parameter is one of a maximum receive time difference and maximum transmit time difference.

7. The wireless device of claim 1, wherein the communicating with the first cell using the first signal and the second cell using the second signal is part of one of carrier aggregation and dual connectivity.

8. The wireless device of claim 1, wherein each TMG of the quantity of TMGs is a timing advance group that is associated with a set of timing parameters different from the at least one MOTD parameter for performing the communication with the first cell using the first signal and the second cell using the second signal.

9. The wireless device of claim 1, wherein the determination of the at least one MOTD parameter is further based at least in part on numerology associated with at least one carrier of at least one serving cell, at least one frequency range of at least one carrier of the at least one serving cell and a predefined relation between a plurality of carriers of a plurality of serving cells, and/or wherein the quantity of TMGs associated with the first signal in the first cell and the second signal in the second cell corresponds to one of a quantity of TMGs the wireless device is configured to support and a quantity of TMGs the wireless device is able to support based on wireless device capability.

10. A method for a wireless device configured to communicate with a network node, the method comprising:
    determining a quantity of timing management groups (TMGs) associated with a first signal in a first cell and a second signal in a second cell;

determining at least one maximum operational timing difference (MOTD) parameter based at least in part on the quantity of TMGs, the at least one MOTD parameter corresponding to a maximum time difference in communication between the first signal and the second signal; and communicating with the first cell using the first signal and the second cell using the second signal based at least in part on the at least one MOTD parameter, wherein the quantity of TMGs is determined to be one TMG where the first cell and the second cell being part of the one TMG, and wherein the quantity of TMGs is determined to be greater than two TMGs; and where the at least one MOTD parameter corresponding to a plurality of MOTD parameters, and each TMG operating according to a respective one of the plurality of MOTD parameters.

11. The method of claim 10, further comprising:

determining whether an estimate of a communication of the first signal and the second signal exceeds the at least one MOTD parameter; and performing at least one operational task based at least in part on whether the estimate of the communication of the first signal and the second signal exceeds the at least one MOTD parameter.

12. The method of claim 11, wherein if the estimate of the communication of the first signal and the second signal exceeds the at least one MOTD parameter, the at least one operational task includes at least one of:

stopping multicarrier operation;

releasing one of the first cell and the second cell;

discarding at least communication of at least one of the first signal and the second signal; and discarding at least one data block.

13. The method of claim 11, wherein if the estimate of the communication of the first signal and the second signal does not exceed the at least one MOTD parameter, the at least one operational task includes at least one of:

using a third cell for communication in addition to the first cell and the second cell; and resuming multicarrier operation.

14. The method of claim 11, wherein the estimate of the communication of the first signal and the second signal is an estimate of a magnitude of the time difference between the first signal and the second signal, and/or wherein the estimate of the magnitude of the time difference between the first signal and the second signal corresponds to an estimate of one of a magnitude of a receive time difference between the first signal and the second signal and a magnitude of a transmit time difference between the first signal and the second signal.

15. The method of claim 10, wherein the at least one MOTD parameter is one of a maximum receive time difference and maximum transmit time difference.

16. The method of claim 10, wherein the communicating with the first cell using the first signal and the second cell using the second signal is part of one of carrier aggregation and dual connectivity.

17. The method of claim 10, wherein each TMG of the quantity of TMGs is a timing advance group that is associated with a set of timing parameters different from the at least one MOTD parameter for performing the communication with the first cell using the first signal and the second cell using the second signal.

18. The method of claim 10, wherein the determination of the at least one MOTD parameter is further based at least in part on numerology associated with at least one carrier of at least one serving cell, at least one frequency range of at least one carrier of the at least one serving cell and a predefined relation between a plurality of carriers of a plurality of serving cells, and/or wherein the quantity of TMGs associated with the first signal in the first cell and the second signal in the second cell corresponds to one of a quantity of TMGs the wireless device is configured to support and a quantity of TMGs the wireless device is able to support based on wireless device capability.

* * * * *